United States Patent
Chan et al.

(10) Patent No.: US 9,256,306 B2
(45) Date of Patent: Feb. 9, 2016

(54) SENSING APPARATUS AND DRIVING METHOD THEREOF

(75) Inventors: Isaac Wing-Tak Chan, Hsinchu (TW); Chen-Wei Lin, Kaohsiung (TW); Chih-Chieh Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 321 days.

(21) Appl. No.: 13/439,871

(22) Filed: Apr. 5, 2012

(65) Prior Publication Data

US 2013/0162587 A1   Jun. 27, 2013

(30) Foreign Application Priority Data

Dec. 27, 2011 (TW) .............................. 100148923 A

(51) Int. Cl.
*G06F 3/041* (2006.01)
(52) U.S. Cl.
CPC ...................... *G06F 3/041* (2013.01)
(58) Field of Classification Search
CPC ..... G06F 3/042; G06F 3/041; G02F 1/13338; G02F 2001/13312; H01L 27/14609; H01L 27/14643; H01L 27/14645; H01L 27/14612; G06K 9/0004; H04N 3/1506; H04N 5/335
USPC ................... 345/173–178; 178/18.01–20.04
See application file for complete search history.

(56) References Cited

U.S. PATENT DOCUMENTS

| | | | |
|---|---|---|---|
| 7,688,370 B2 | 3/2010 | Hur et al. | |
| 7,759,628 B2 | 7/2010 | Kanda et al. | |
| 2001/0038075 A1* | 11/2001 | Morishita | 250/370.08 |
| 2002/0024068 A1* | 2/2002 | Shinohara | 257/225 |
| 2007/0146282 A1* | 6/2007 | Choo et al. | 345/98 |
| 2007/0187609 A1 | 8/2007 | Karim | |
| 2008/0259182 A1 | 10/2008 | Karim et al. | |
| 2008/0291310 A1* | 11/2008 | Ladd et al. | 348/308 |
| 2009/0147118 A1 | 6/2009 | Karim et al. | |

(Continued)

FOREIGN PATENT DOCUMENTS

| | | |
|---|---|---|
| TW | 530488 | 5/2003 |
| TW | 201310006 | 3/2013 |

(Continued)

OTHER PUBLICATIONS

Brown et al., "24.3L: Late-News Paper: In-Cell Capacitance Touch-Panel with Improved Sensitivity", SID 10 Digest, May 2010, vol. 41, Issue 1, pp. 346-349.

(Continued)

*Primary Examiner* — Aneeta Yodichkas
*Assistant Examiner* — Richard Hong
(74) *Attorney, Agent, or Firm* — Jianq Chyun IP Office

(57) ABSTRACT

A sensing apparatus including a first scan line, a second scan line, a readout line, a first sensing device and a second sensing device is provided. The first sensing device is coupled to the first scan line and the readout line, and senses a first energy, and outputs a first readout signal corresponding to the first energy to the readout line in response to a first scan signal on the first scan line. The first sensing device is reset in response to the first scan signal and a reference signal on the readout line. The first sensing device includes a first reset unit configured for resetting the first sensing device, where a first terminal of the first reset unit is coupled to the first scan line, and a control terminal of the first reset unit is coupled to the readout line. A driving method thereof is also provided.

24 Claims, 12 Drawing Sheets

(56) References Cited

U.S. PATENT DOCUMENTS

| | | | |
|---|---|---|---|
| 2010/0013796 A1* | 1/2010 | Abileah et al. | 345/175 |
| 2010/0066724 A1* | 3/2010 | Huh et al. | 345/213 |
| 2011/0101204 A1 | 5/2011 | Cieslinski | |
| 2012/0001865 A1* | 1/2012 | Chen et al. | 345/174 |

FOREIGN PATENT DOCUMENTS

| | | |
|---|---|---|
| WO | 2005015639 | 2/2005 |
| WO | 2007084308 | 7/2007 |

OTHER PUBLICATIONS

Takahashi et al., "38.4: Invited Paper: In-Cell Embedded Touch Screen Technology for Large Size LCD Applications", SID 10 Digest, May 2010, vol. 41, Issue 1, pp. 544-547.

Karim et al., "Amorphous Silicon Active Pixel Sensor Readout Circuit for Digital Imaging", IEEE Transactions on Electron Devices, vol. 50, Issue 1, Jan. 2003, pp. 200-208.

Karim et al., "Amplified Pixel Architectures in Amorphous Silicon Technology for Large Area Digital Imaging Applications", Journal of the Korean Physical Society, vol. 48, Jan. 2006, pp. S85-S91.

Izadi et al, "Noise optimisation analysis of an active pixel sensor for low-noise real-time X-ray fluoroscopy", IET Circuits Devices Syst., vol. 1, Issue 3, Jun. 2007, pp. 251-256.

Izadi et al., "Performance of a Prototype Amorphous Silicon Active Pixel Sensor Array using a-Se for Direct X-ray Conversion", Physics of Medical Imaging Proc. of SPIE, vol. 7622, Feb. 15, 2010, pp. 76223V-1-76223V-10.

* cited by examiner

SENSING APPARATUS AND DRIVING METHOD THEREOF

CROSS-REFERENCE TO RELATED APPLICATION

This application claims the priority benefit of Taiwan application serial no. 100148923, filed on Dec. 27, 2011. The entirety of the above-mentioned patent application is hereby incorporated by reference herein and made a part of this specification.

BACKGROUND

1. Technical Field

The disclosure relates to a sensing apparatus and a driving method thereof.

2. Related Art

With the development of sensing technologies, flat-plate sensing unit arrays have been widely applied in many different fields, for example, applied to optical image sensors, digital radiography sensors (DRS), and touch screen sensors and so forth. A structure of a main device (an active array substrate) of the flat-type sensing unit array is similar to a substrate in a flat panel display, for example, similar to a thin-film transistor array substrate in a thin film transistor liquid crystal display (TFT-LCD).

To further improve the sensing effect, the current sensing technique is developed towards a trend of large area sensing, improvement of a low-energy sensing capability and high resolution. However, enhancement of the resolution may reduce a pixel area of a sensor, and accordingly reduce sensitivity of the sensor for sensing an incident energy. Moreover, low incident energy may result in a low strength of an electric signal converted from the energy by the sensor. Moreover, the large area sensing is liable to generate noises due to resistance and capacitance (RC) coupling of the sensor.

Generally, a pixel on a the conventional active array substrate only contains a single thin film transistor to serve as a switch for read and reset operations, and such structure cannot achieve signal gain to mitigate the noise problem. A conventional design that has a pixel amplifier can only resolve a part of the aforementioned problems, and cannot resolve all of the aforementioned problems.

SUMMARY

The disclosure provides an exemplary embodiment of a sensing apparatus. According to the exemplary embodiment, the sensing apparatus includes a first scan line, a second scan line, a readout line, a first sensing device and a second sensing device. The first sensing device is coupled to the first scan line and the readout line, and configured for sensing a first energy on the first sensing device, where the first sensing device outputs a first readout signal corresponding to the first energy to the readout line in response to a first scan signal on the first scan line, and the first sensing device is reset in response to the first scan signal and a reference signal provided by an external interpretation unit on the readout line. The first sensing device includes a first reset unit configured for resetting the first sensing device, where a first terminal of the first reset unit is coupled to the first scan line, and a control terminal of the first reset unit is coupled to the readout line.

The disclosure provides an exemplary embodiment of a driving method. According to the exemplary embodiment, the driving method is applicable to a sensing apparatus, and includes the following steps. In the sensing apparatus, a first sensing device and a second sensing device are provided to respectively sense a first energy and a second energy. The first sensing device is enabled to output a first readout signal corresponding to the first energy in response to a first scan signal from a first scan line. In addition, the second sensing device is enabled to output a second readout signal corresponding to the second energy in response to a second scan signal from a second scan line. Moreover, the first sensing device and the second sensing device are reset at the same time or in sequence in response to a reset voltage having at least one pulse signal transmitted on the first scan line and the second scan line or on a readout line.

The disclosure provides an exemplary embodiment of a driving method. According to the exemplary embodiment, the driving method is applicable to a sensing apparatus, and includes the following steps. A plurality of sensing devices are provided in the sensing apparatus. A plurality of reset units are respectively disposed in the sensing devices. A direct current bias of a preset time interval is applied at the same time through a plurality of readout lines respectively connected to a plurality of control terminals of the reset units, or a negative scan bias of the preset time interval is applied at the same time through a plurality of scan lines connected to the reset units, to program a plurality of threshold voltages of the control terminals of the reset units.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
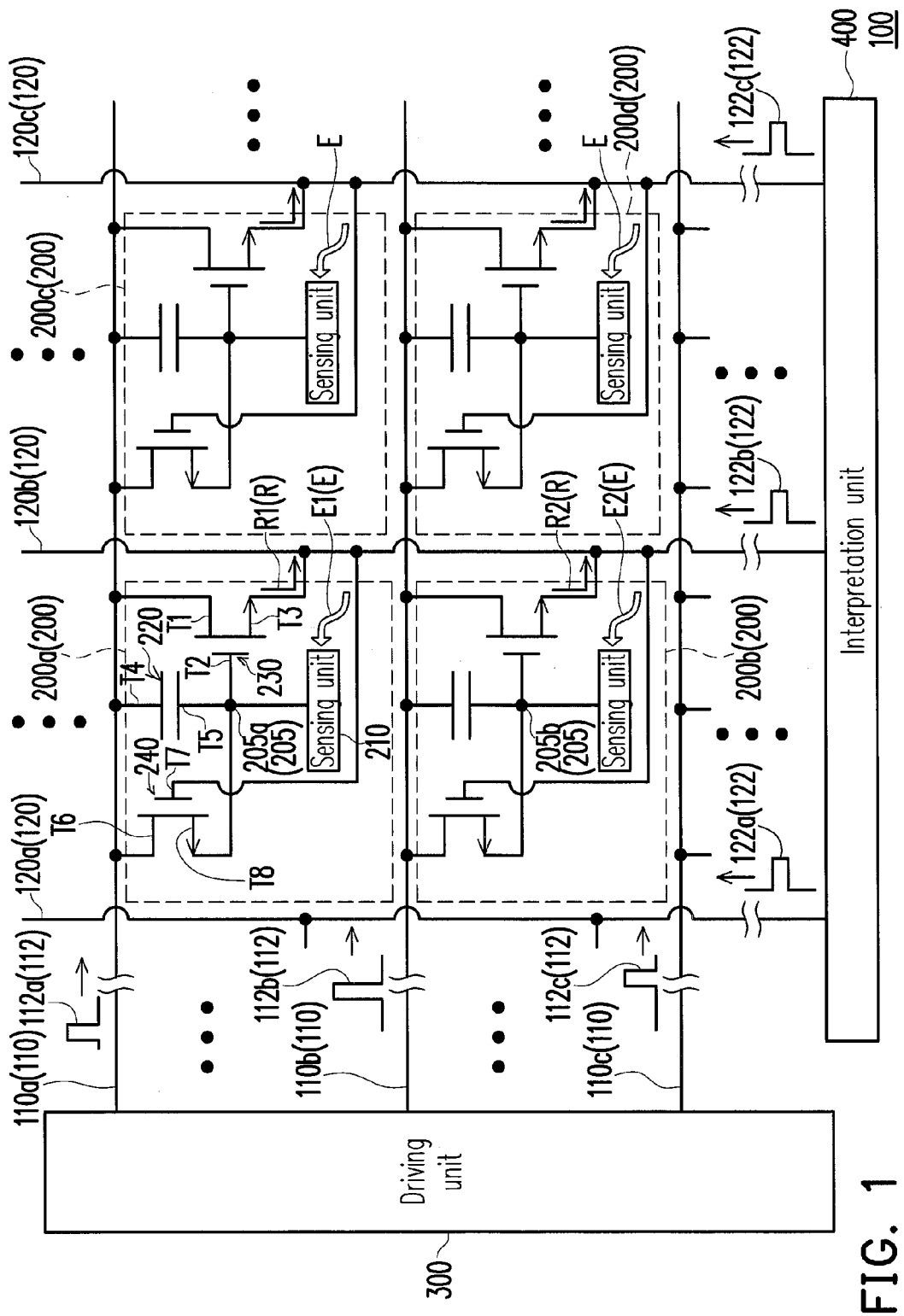
FIG. 1 is a schematic circuit diagram illustrating a sensing apparatus according to an exemplary embodiment of the disclosure.

FIG. 1 is a schematic circuit diagram illustrating a sensing apparatus according to an exemplary embodiment of the disclosure. Referring to FIG. 1, the sensing apparatus 100 of this embodiment includes a plurality of scan lines 110, a plurality of readout lines 120 and a plurality of sensing devices 200. FIG. 1 illustrates, as an example, three scan lines 110a, 110b and 110c, three readout lines 120a, 120b and 120c and four sensing devices 200a, 200b, 200c and 200d, and in this embodiment, the circuit structure of the sensing devices 200, the scan lines 110 and the readout lines 120 may repeatedly appear at top, bottom, left and right of FIG. 1.

For example, the scan lines 110 are arranged in sequence from a first scan line 110, a second scan line 110 to a $K^{th}$ scan line 110 from top to bottom of FIG. 1, where K is a positive integer greater than or equal to 3. The scan lines 110a, 110b and 110c in FIG. 1 are respectively an $N^{th}$ scan line 110, an $(N+1)^{th}$ scan line 110 and an $(N+2)^{th}$ scan line 110, where N is a positive integer smaller than or equal to K−2. The readout lines 120 are arranged in sequence from a first readout line to a $J^{th}$ readout line from left to right of FIG. 1, where J is a positive integer greater than or equal to 2. The readout line 120a, 120b and 120c in FIG. 1 are respectively an $(M−1)^{th}$ readout line 120, an $M^{th}$ readout line and an $(M+1)^{th}$ readout line, where M is a positive integer smaller than or equal to J−1. If J=2, the readout line 120a may be removed. Each of the sensing devices 200 is coupled to a neighboring scan line 110, and coupled to one adjacent readout line 120. For example, the sensing device 200a is coupled to the scan line 110a and the readout line 120b, and the sensing device 200b is coupled to the scan line 110b and the readout line 120b. Moreover, each of the sensing devices 200 is configured for sensing an energy E applied thereon. For example, the sensing device 200a is configured for sensing energy E1, and the sensing device 200b is configured for sensing energy E2.

The sensing device 200a outputs a readout signal R1 corresponding to the energy E1 to the readout line 120b in response to a scan signal 112a on the scan line 110a. The sensing device 200b outputs a readout signal R2 corresponding to the energy E2 to the readout line 120b in response to a scan signal 112b on the scan line 110b. Moreover, the scan signal 112b works in cooperation with a reference voltage or reference signal (may be considered as a reset signal) on the readout line 120b to reset the sensing device 200a.

In the present embodiment, each of the sensing devices 200 (for example, the sensing device 200a, 200b, 200c or 200d) includes a sensing unit 210, a storage unit 220, an amplification unit 230 and a reset unit 240. The sensing unit 210 is configured for sensing the energy E, and converting the sensed energy E to a data signal. The storage unit 220 is coupled to a neighboring scan line 110 and the sensing unit 210, and is configured for storing the data signal. For example, the sensing unit 210 of the sensing device 200a is configured for sensing the energy E1, and converting the sensed energy E1 to the data signal, and the storage unit 220 of the sensing device 200a is coupled to the scan line 110a and the sensing unit 210 of the sensing device 200a, and configured for storing the data signal converted from the energy E1.

The amplification unit 230 is coupled to the storage unit 220, the adjacent scan line 110 and a adjacent readout line 120, where the amplification unit 230 outputs the readout signal R corresponding to the data signal to the readout line 120 in response to the scan signal 112 from the neighboring scan line 110. Moreover, the reset unit 240 is coupled to the storage unit 220, the neighboring scan line 110 and a neighboring readout line 120 (that is, the readout line 120b), and the reset unit 240 is used for resetting the storage unit 220 in response to the scan signal 112 from the neighboring scan line 110 (for example, the scan line 110 above the reset unit 240 in the figure) and a reference signal 122 of the neighboring readout line 120 (that is, the readout line 120b, which is the readout line 120 on the right of the amplification unit 230 in FIG. 1).

For example, the amplification unit 230 of the sensing device 200a is coupled to the storage unit 220 of the sensing device 200a, the scan line 110a and the readout line 120b, where the amplification unit 230 of the sensing device 200a outputs the readout signal R corresponding to the data signal stored by the storage unit 220 of the sensing device 200a to the readout line 120b in response to the scan signal 112a from the scan line 110a. Moreover, the reset unit 240 of the sensing device 200a is coupled to the storage unit 220 of the sensing device 200a, the scan line 110a and the readout line 120b, and the reset unit 240 of the sensing device 200a is configured for resetting the storage unit 220 of the sensing device 200a in response to the scan signal 112a from the scan line 110a and a reference signal 122b from the readout line 120b.

In this embodiment, in each sensing device 200, the energy E applied on each sensing device 200 may be light energy or electromagnetic energy, and the sensing unit 210 may be an electromagnetic sensing unit, and for example, is a photodiode. However, in another embodiment, the electromagnetic sensing unit may also be a photoresistor, a photoconductor, a phototransistor or other suitable electromagnetic sensing devices. Moreover, in other embodiments, the energy E may also be mechanical energy such as elastic potential or kinetic energy, and the sensing unit 210 is, for example, a pressure sensing unit. The pressure sensing unit is, for example, a piezoelectric sensing element (piezoelectric sensor) or other suitable pressure sensing unit. In addition, the energy E may also be heat energy, and the sensing unit 210 is, for example, a temperature sensing unit. Furthermore, the energy E may also be electric energy, and the sensing unit 210 is, for example, a touch sensing unit, configured for sensing changes in capacitance caused by touch of a finger or other objects. In other embodiments, the energy E may also be energy of other forms that can be detected, and the sensing unit 210 may be a sensor capable of detecting the energy.

In this embodiment, a current input terminal T1 of the amplification unit 230 of the sensing device 200a is coupled to the scan line 110a and a first terminal T4 of the storage unit 220 of the sensing device 200a. A control terminal T2 of the amplification unit 230 of the sensing device 200a is coupled to a second terminal T5 of the storage unit 220 of the sensing device 200a. A current output terminal T3 of the amplification unit 230 of the sensing device 200a is coupled to the readout line 120b. The amplification unit 230 is, for example, a transistor. In the present embodiment, the amplification unit 230 in each of the sensing devices 200 is, for example, a field effect transistor, and the current input terminal T1, the control terminal T2 and the current output terminal T3 are, for example, respectively a source, a gate and a drain of the field effect transistor. However, the implementation of the present disclosure is not limited to the aforementioned descriptions, and in other embodiments, the amplification unit 230 may also be a bipolar transistor or other transistors.

In the present embodiment, the storage unit 220 in each of the sensing devices 200 is, for example, a capacitor, and a capacitance value of the capacitor is far greater than a parasitic capacitance value (greater than or approximating 0.055 pF) between the current input terminal T1 and the control terminal T2 of the amplification unit 230. In one embodiment, the capacitance value of the capacitor is greater than or approximately equals to 0.55 pF, or the capacitance value of the capacitor is greater than or approximately equals to 10 times of the parasitic capacitance value between the current input terminal T1 and the control terminal T2 of the amplification unit 230.

In the present embodiment, a first terminal T6 of the reset unit 240 of the sensing device 200a is coupled to the scan line 110a, a control terminal T7 of the reset unit 240 of the sensing device 200a is coupled to the readout line 120b, and a second terminal T8 of the reset unit 240 of the sensing device 200a is coupled to the control terminal T2 of the amplification unit 230 of the sensing device 200a (that is, coupled to the second terminal T5 of the storage unit 220 of the sensing device 200a at the same time). In the present embodiment, the reset unit 240 in each of the sensing devices 200 is, for example, a field effect transistor; and the first terminal T6, the control terminal T7 and the second terminal T8 are, for example, respectively a source, a gate and a drain of the field effect transistor. However, the implementation of the present disclosure is not limited to the aforementioned description, and in other embodiments, the reset unit 240 may also be a bipolar transistor, other transistors, or other switch elements.

In the present embodiment, the sensing unit 210 of the sensing device 200b is configured for sensing the energy E2, and converting the sensed energy E2 to a data signal. The storage unit 220 of the sensing device 200b is coupled to the scan line 110b and the sensing unit 210 of the sensing device 200b, and configured for storing the data signal converted from the energy E2. The amplification unit 230 of the sensing device 200b is coupled to the storage unit 220 of the sensing device 200b, the scan line 110b and the readout line 120b, where the amplification unit 230 outputs the readout signal R2 corresponding to the data signal converted from the energy E2 to the readout line 120b in response to the scan signal 112b from the scan line 110b.

Moreover, in the present embodiment, the reset unit 240 of the sensing device 200b is coupled to the storage unit 220 of the sensing device 200b, the scan line 110b and the readout line 120b, and the reset unit 240 of the sensing device 200b is configured for resetting the storage unit 220 of the sensing device 200b in response to the scan signal 112b from the scan line 110b and the reference signal 122b from the readout line 120b.

Specifically, in the present embodiment, the current input terminal T1 of the amplification unit 230 of the sensing device 200b is coupled to the scan line 110b and the first terminal T4 of the storage unit 220 of the sensing device 200b, the control terminal T2 of the amplification unit 230 of the sensing device 200b is coupled to the second terminal T5 of the storage unit 220 of the sensing device 200b, and the current output terminal T3 of the amplification unit 230 of the sensing device 200b is coupled to the readout line 120b. In addition, the first terminal T6 of the reset unit 240 of the sensing device 200b is coupled to the scan line 110b, the control terminal T7 of the reset unit 240 of the sensing device 200b is coupled to the readout line 120b, and the second terminal T8 of the reset unit 240 of the sensing device 200b is coupled to the control terminal T2 of the amplification unit 230 of the sensing device 200b (that is, coupled to the second terminal T5 of the storage unit 220 of the sensing device 200b at the same time).

Figure 6:
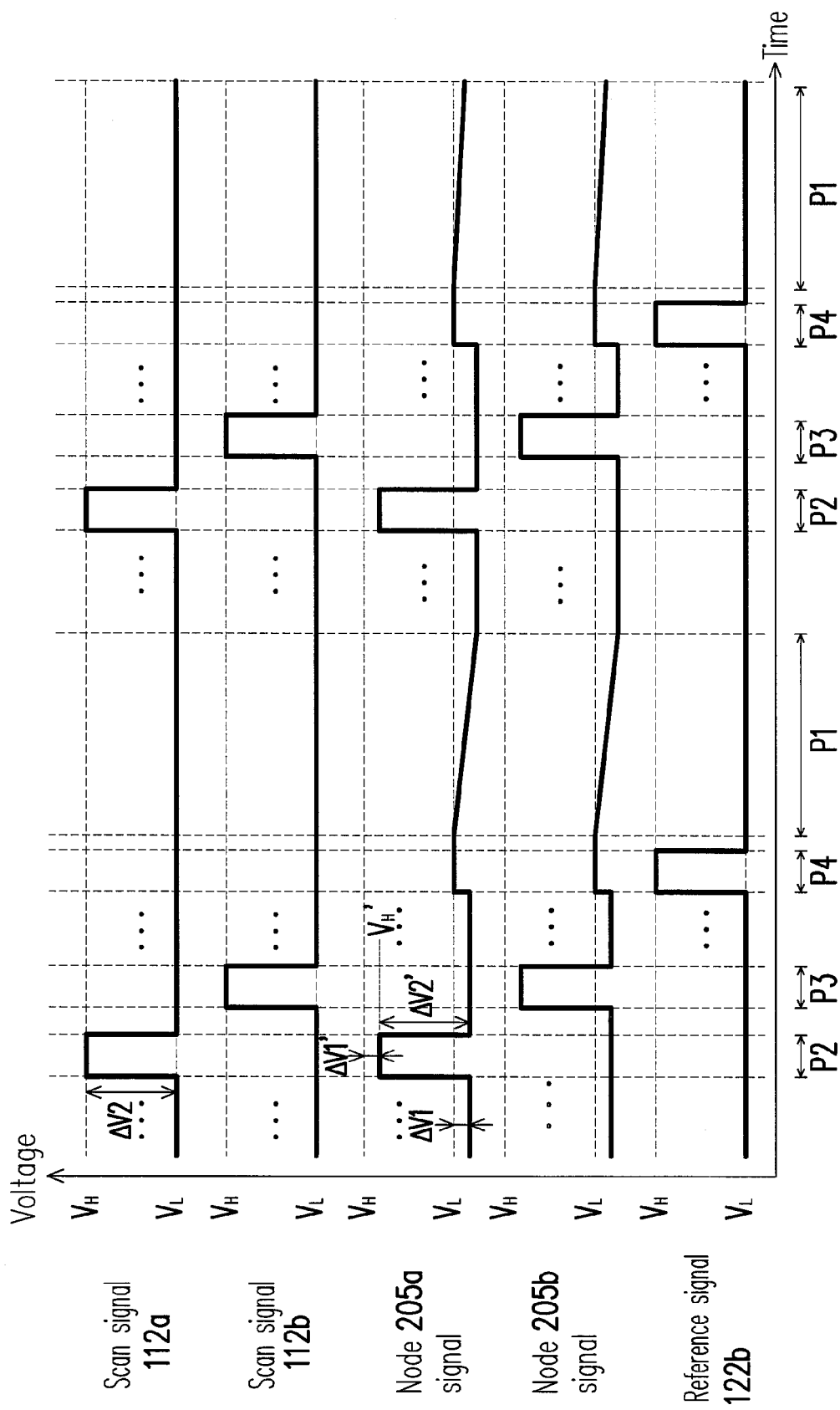
FIG. 6 is a waveform diagram of the sensing apparatus of FIG. 1 according to a first embodiment.

FIG. 6 is a waveform diagram of the sensing apparatus of FIG. 1 according to a first embodiment. A plurality of waveforms of FIG. 6 illustrate a driving method of the sensing apparatus 100 at the same time. Referring to FIG. 6, in the present embodiment, the scan signals 112 respectively enable the sensing devices 200 in sequence. For example, the scan signal 112a and the scan signal 112b respectively enable the sensing device 200a and a next-level sensing device (that is, the sensing device 200b) of the sensing device 200a in sequence. In the present embodiment, the scan signals 112 are transmitted by a driving unit 300, and the driving unit 300 is electrically connected to the scan lines 110. The driving unit 300 is, for example, a driving circuit.

Referring to FIG. 6, in this embodiment, when a time interval P2 is entered, and the scan signal 112a of the scan line 110a increases from a low voltage level $V_L$ to a high voltage level $V_H$, the voltage variation is $\Delta V2$; and the scan signal 112 enables a voltage of a contact 205a to increase to a voltage of $\Delta V2+\Delta V1$ by a capacitive coupling effect of the storage unit 220 of the sensing device 200a (in the present embodiment, $\Delta V1$ is, for example, a negative value). The reason is that in a detection stage of a previous cycle, a charge data signal stored by the storage unit 220 in the sensing device 200a at this time is a negative voltage $\Delta V1$, that is, the second terminal T5 (that is, the contact 205a) of the storage unit 220 is at a negative voltage potential of $\Delta V1$ in the detection stage of the previous cycle. Therefore, the voltage of the contact 205a in the time interval P2 is $\Delta V2+\Delta V1$ due to the capacitive coupling effect. For example, the time interval P2 is corresponding to a read time interval of the sensing device 200a, and when the scan signal 112a is in the high voltage level $V_H$, an interpretation unit 400 obtains the readout signal R1 output by the sensing device 200a through the readout line 120b.

For example, in a time interval P3 of FIG. 6, the scan signal 112a on the scan line 110a is in the low voltage level $V_L$, the scan signal 112b on the scan line 110b is in the high voltage level $V_H$, and the reference signal 122b on the readout line 120b is in the low voltage level $V_L$. At this time, the scan signal 112a and the reference signal 122b make voltages of the current input terminal T1 and the current output terminal T3 of the amplification unit 230 to be in the low voltage level $V_L$ at the same time, so that the current output terminal T3 of the amplification unit 230 does not output a current signal to the readout line 120b. Furthermore, the reset unit 240 is in an off state, and the contact 205a returns to a final state of the charge data signal stored by the storage unit 220 in the sensing device 200a in the detection stage of the previous cycle, that is, at the negative voltage potential of $\Delta V1$. In other words, after the read time interval P2 of the sensing device 200a, the charge data signal stored by the storage unit 220 can be saved for repeated reading.

The time interval P3 of FIG. 6 is corresponding to a read time interval of the sensing device 200b, and similar to the read mode of the sensing device 200a, the interpretation unit 400 obtains the readout signal R2 output by the sensing device 200b through the readout line 120b. In the implementation of the present disclosure, after the readout signals of the sensing devices 200 in all rows are read in sequence, the interpretation unit 400 may provide a reference signal 122b through the readout line 120b to reset the sensing devices 200 of all rows in the column, after the time interval P3, for example, in a time interval P4.

To be illustrated in more detail, after the time interval P3, for example, in the time interval P4, the time interval P4 is corresponding to a reset time interval of all the sensing devices 200. For example, when the scan signal 112a is in the low voltage level $V_L$, and the reference signal 122b is in the high voltage level $V_H$, the reference signal 122b is transmitted to the control terminal T7 of the reset unit 240 to make the reset unit 240 to be in an on state, so that the contact 205a and the scan signal 112a are also in the low voltage level $V_L$. Thus, the scan line 110a and the contact 205a are both in the low voltage level $V_L$, such that there is substantially no charge accumulated on the storage unit 220, thereby achieving the effect of resetting the storage unit 220 by the reference signal 122b on the readout line 120b. At this time, the control terminal T2 of the amplification unit 230 is also in the low voltage level $V_L$, and accordingly the amplification unit 230 is in an off state, such that the current output terminal T3 of the amplification unit 230 does not output a current signal to the readout line 120b.

Figure 2:
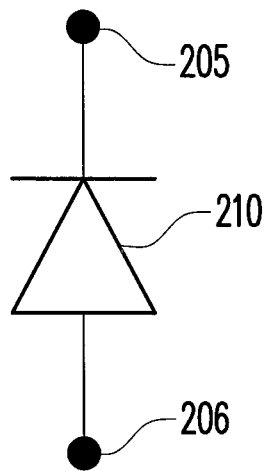
FIG. 2 illustrates an embodiment of a sensing device in FIG. 1.

FIG. 2 illustrates an embodiment of a sensing device in FIG. 1. Referring to FIG. 1 to FIG. 2, the sensing unit 210 in FIG. 2 is, for example, a photodiode, and an N-electrode of the photodiode is coupled to a contact 205, where the contact 205 is coupled between the second terminal T8 of the reset unit 240 and the control terminal T2 of the amplification unit 230, and coupled between the second terminal T5 of the storage unit 220 and the N-electrode of the photodiode. In addition, a P-electrode of the photodiode is coupled to an endpoint 206. For example, in the time interval P1 after the time interval P4 of FIG. 6, a negative voltage is applied on the endpoint 206. At this time, both the scan signal 112a on the scan line 110a and the scan signal 112b on the scan line 110b are still in the low voltage level $V_L$, and accordingly the contact 205a is still in the low voltage level. Therefore, the sensing unit 210 (that is, the photodiode) of the sensing device 200a bears a reverse bias. At this time, if light is irradiated on the sensing unit 210 of the sensing device 200a (that is, the sensing unit 210 receives the energy E), a reverse current flowing through the sensing unit 210, that is, a current flowing from the contact 205 (that is, the contact 205a) to the endpoint 206, is generated, causing that charges accumulate on the storage unit 220 of the sensing device 200a. In other words, the time interval P1 of FIG. 6 is a sensing time interval of the sensing device 200. Thus, a voltage difference ΔV1 exists between the second terminal T5 of the storage unit 220 of the sensing device 200a and the first terminal T4. As the scan line 110a is still maintained at the low voltage $V_L$ at this time, the voltage of the contact 205a is maintained at $V_L$+ΔV1 at the end of the time interval P1 of FIG. 6. In this embodiment, ΔV1 is, for example, a negative value.

In the time interval P2 after the time interval P1 of FIG. 6, the scan signal 112a of the scan line 110a is in the high voltage level $V_H$, and the reference signal 122b of the readout line 120b is in the low voltage level $V_L$. At this time, the reference signal 122b makes the control terminal T7 of the reset unit 240 of the sensing device 200a to be in the low voltage $V_L$, such that the reset unit 240 is in the off state. On the other hand, the scan signal 112a makes the voltage of the contact 205a increase to a voltage level $V_H'$ slightly lower than the high voltage level $V_H$ by the capacitive coupling effect of the storage unit 220 of the sensing device 200a. In an ideal state, by the capacitive coupling effect, the voltage variation ΔV2 of the scan signal 112a increasing from the low voltage level $V_L$ to the high voltage level $V_H$ is substantially equal to a voltage variation ΔV2' of the contact 205a increasing from the voltage $V_L$+ΔV1 to the voltage $V_H'$. However, in an actual state, the voltage variation ΔV2' is slightly less than the voltage variation ΔV2.

In the ideal state, as ΔV2 is substantially equal to ΔV2', a voltage difference ΔV1' between the voltage level $V_H'$ and the high voltage level $V_H$ is substantially equal to the voltage difference ΔV1. However, in the practical application, an absolute value of the voltage difference ΔV1' is slightly greater than that of the voltage difference ΔV1.

When the sensing unit 210 of the sensing device 200a does not sense the energy E in the time interval P1 of FIG. 6, no current flowing through the sensing unit 210 is generated, such that no charge is accumulated on the storage unit 220. In other words, a cross-voltage on the storage unit 220 is 0, that is, the voltage of the contact 205a is also at the low voltage level $V_L$ at this time. Therefore, in the time interval P2 after the time interval P1 of FIG. 6, in the ideal state, the scan signal 112a at the high voltage level $V_H$ makes the voltage of the contact 205a to be also in the high voltage level $V_H$ by the capacitive coupling effect of the storage unit 220. At this time, the amplification function of the amplification unit 230 of the sensing device 200a converts the high voltage level $V_H$ of the contact 205a to a current I flowing from the current input terminal T1 to the current output terminal T3 of the amplification unit 230.

However, when the sensing unit 210 of the sensing device 200a senses the energy E in the time interval P1 of FIG. 6, different voltage differences ΔV1 are generated correspondingly at the two terminals of the storage unit 220 of the sensing device 200a, depending on the magnitude of the sensed energy E. Thus, in the time interval P2 after the time interval P1, different voltage differences ΔV1' are generated correspondingly. By the amplification function of the amplification unit 230 of the sensing device 200a, the voltage level of $V_H$+ΔV1' of the contact 205a is converted to a current I+ΔI flowing from the current input terminal T1 to the current output terminal T3 of the amplification unit 230, where the value of ΔI is corresponding to the value of ΔV1', such that different voltage differences ΔV1' generate different ΔI correspondingly.

In the time interval P2, the current I or current I+ΔI flows to the readout line 120b, and then flows to the interpretation unit 400. The interpretation unit 400 is electrically connected to the readout lines 120, so as to interpret a current signal (that is, the readout signal R) from the readout line 120. When the current from the readout line 120 is I, the interpretation unit 400 determines that the sensing unit 210 of the sensing device 200 outputting the current does not sense the energy E. When the current from the readout line 120 is I+ΔI, the interpretation unit 400 determines a magnitude of the energy E sensed by the sensing unit 210 of the sensing device 200 outputting the current according to the absolute value of ΔI. For example, the greater the absolute value of ΔI is, the greater the energy E sensed by the sensing unit 210 is.

As the scan signals 112 of the scan lines 110 enable the sensing devices 200 in sequence, the sensing devices 200 of different rows (for example, the sensing device 200a and the sensing device 200b) output current signals to the interpretation unit 400 in sequence. Therefore, according to time when the current signal is received, the interpretation unit 400 can determine the current signal is from the sensing device 200 of which row. On the other hand, the sensing devices 200 of the same row (for example, the sensing device 200a and the sensing device 200c) may be driven by the scan signal 112 of the same scan line 110 at the same time, but the sensing devices 200 of the same row output a current signal to different readout lines 120 at the same time. Therefore, according to the readout line 120 which the current signal is from, the interpretation unit 400 can determine the current signal is from the sensing device 200 of which row. Thus, one of the sensing devices 200 can be considered as a pixel. After the time interval P1, the time interval P2, the time interval P3 of FIG. 6 or a time interval after the time interval P3 elapses, or further after enable time intervals of other scan signals 112 between the time interval P1 and the time interval P2 of FIG. 6 and enable time intervals of other scan signals 112 between the time interval P3 and a next time interval P1 elapses, the sensing apparatus 100 can capture an image of one frame. Moreover, after the time intervals P1, P2 and P3 repeatedly appear, the sensing apparatus 100 can capture a plurality of frames, and thus can capture dynamic images.

Other detailed operation modes of the sensing device 200b may be referred to the aforementioned description of the operation mode of the sensing device 200a, where the function of the scan signal 112a received by the sensing device 200a is equivalent to that of the scan signal 112b received by the sensing device 200b, and the function of the reference signal 122b received by the sensing device 200a is equivalent to that of the reference signal 122b received by the sensing device 200b.

A signal of the contact 205b of the sensing device 200b and a signal of the contact 205 of a next-level sensing device 200 may be as illustrated in FIG. 6. The time interval P2 of FIG. 6 is a read time interval of the sensing device 200a (that is, a time interval configured for outputting the readout signal R1). The time interval P3 of FIG. 6 is a read time interval of the sensing device 200b (that is, time interval for outputting the readout signal R2). The time interval P4 of FIG. 6 is a reset time interval of all sensing devices 200 of the same column. Other details may be referred to the aforementioned description of the sensing device 200a, and will not be described herein again.

The circuit structures and operation modes of the sensing device 200c, the sensing device 200d and other sensing devices 200 may be referred the aforementioned detailed description of the circuit structures and operation modes of the sensing device 200a and the sensing device 200b, and will not be described herein again.

Moreover, the sensing unit 210 is, for example, a photodetector; and the detected energy E is, for example, light energy or electromagnetic energy, but the present disclosure is not limited thereto. Moreover, the present disclosure also does not limit $\Delta V1$ and $\Delta I$ to be negative values, and when different sensing units 210 or different configuration modes are adopted, $\Delta V1$ and $\Delta I$ may also be positive or negative values.

Figure 3:
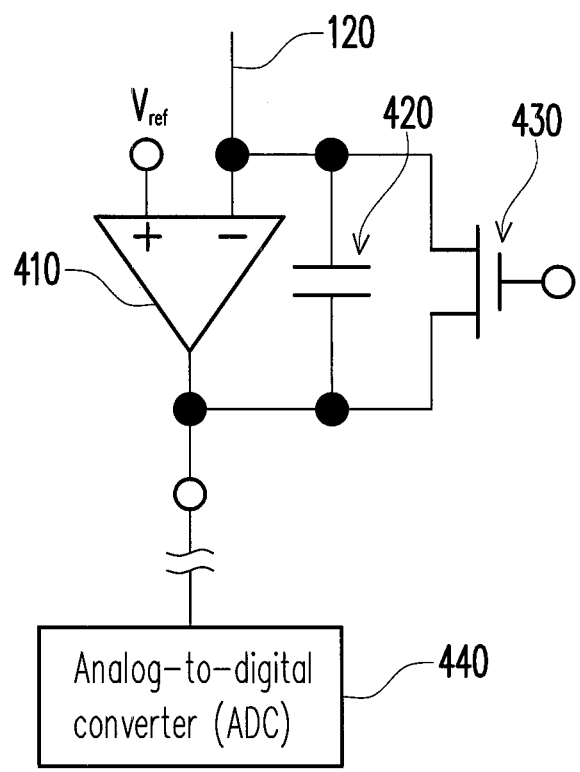
FIG. 3 is a partial schematic circuit diagram illustrating an embodiment of an interpretation unit in FIG. 1.

FIG. 3 is a partial schematic circuit diagram illustrating an embodiment of an interpretation unit in FIG. 1. Referring to FIG. 1 and FIG. 3, in this embodiment, the interpretation unit 400 includes a plurality of operational amplifiers 410, a plurality of capacitors 420, a plurality of switch elements 430 and a plurality of analog-to-digital converters (ADCs) 440. Each readout line 120 may be coupled to an inverting input terminal of an operational amplifier 410, and a reference voltage $V_{ref}$ is applied on a non-inverting input terminal of the operational amplifier 410. As the inverting input terminal and the non-inverting input terminal of the operational amplifier 410 are virtually connected, the reference signals 122 on the readout lines 120 of each row are corresponding to the reference voltage $V_{ref}$.

In addition, two terminals of a capacitor 420 are respectively coupled to the inverting input terminal and an output terminal of the operational amplifier 410. Moreover, two terminals (for example, a source and a drain) of a switch element 430 (for example, a transistor) are respectively coupled to the two terminals of the capacitor 420. Furthermore, the output terminal of the operational amplifier 410 is coupled to an ADC 440.

The operational amplifier 410 and the capacitor 420 convert a current signal from the readout line 120 to a voltage signal by charges being accumulated on the capacitor 420, and the ADC 440 converts the analog voltage signal to a digital voltage signal. In addition, the switch element 430 is configured for resetting the capacitor 420. Each time before an enable time interval of a next scan signal is entered (for example, before the time interval P2, the time interval P3 and the read time interval after the time interval P3 are entered), the switch element 430 is switched on to short-circuit the two terminals of the capacitor 420, so as to release the charges on the capacitor 420 to reset the capacitor 420. Then, the switch element 430 is switched off, such that the operational amplifier 410 and the capacitor 420 can convert the current signal to the voltage signal in the enable time interval of the next scan signal.

It is noted that, the circuit design of the interpretation unit 400 is not limited to the form illustrated in FIG. 3, and may also adopt other circuit architectures, as long as the magnitude of $\Delta I$ can be interpreted.

In the present embodiment, there is a voltage gain from the voltage signal of the contact 205 to the voltage signal output by the operational amplifier 410, and it can be known through simulation that the sensing apparatus e 100 of the present embodiment has a high voltage gain.

In the sensing apparatus 100 of the present embodiment, as the current I or I+$\Delta I$ of the amplification unit 230 is provided by the scan signal 112 of the scan line 110, the sensing apparatus 100 may apply a bias to the amplification unit 230 without using any additional bias line. Moreover, in the present embodiment, as the reset of the sensing device 200 is achieved by cooperation of the scan signal 112 of the adjacent scan line 110 and the reference signal 122 of the neighboring readout line 120, the sensing apparatus 100 may reset the sensing device 200 without using any additional reset line.

The configuration without bias line and reset line can make the structure of the sensing device 200, the scan line 110 and the readout line 120 finer. Alternatively, from another point of view, the configuration without bias line and reset line may increase a fill factor of the sensing device 200, that is, increase the proportion of the area occupied by the sensing unit 210, thereby improving the sensing sensitivity (for example, photosensitivity) of the sensing apparatus 100. When the sensing apparatus 100 is serves as a radiography sensor, as the sensing apparatus 100 has high photosensitivity, the amount of radiation of the X-ray source can be reduced when a subject is subjected to radiographic examination, so that the exposure of the subject to X-rays is reduced, thereby improving the safety of the subject. Moreover, when the sensing apparatus 100 serves as an image sensing device, as the sensing apparatus 100 has high photosensitivity, an image of an object can still be effectively detected in a weak ambient light environment.

In addition, in the present embodiment, after the storage unit 220 is reset, the current input terminal T1, the control terminal T2 and the current output terminal T3 of the corresponding amplification unit 230 are all in the low voltage level $V_L$, so that a cross-voltage of the current input terminal T1 and the control terminal T2 of the amplification unit 230 and a cross-voltage of the current input terminal T1 and the current output terminal T3 are both small (for example, near 0). As such, the amplification unit 230 has a relatively stable threshold voltage, and current leakage of the amplification unit 230 in the off state can be effectively inhibited. Therefore, the sensing apparatus 100 of the present embodiment can effectively reduce noise. In addition, it can be known from the aforementioned analysis and experimental data that, by the amplification function of the amplification unit 230, the sensing apparatus 100 of the present embodiment has a large voltage gain $A_V$, which also can further improve the sensing sensitivity of the sensing apparatus 100 effectively.

Figure 4:
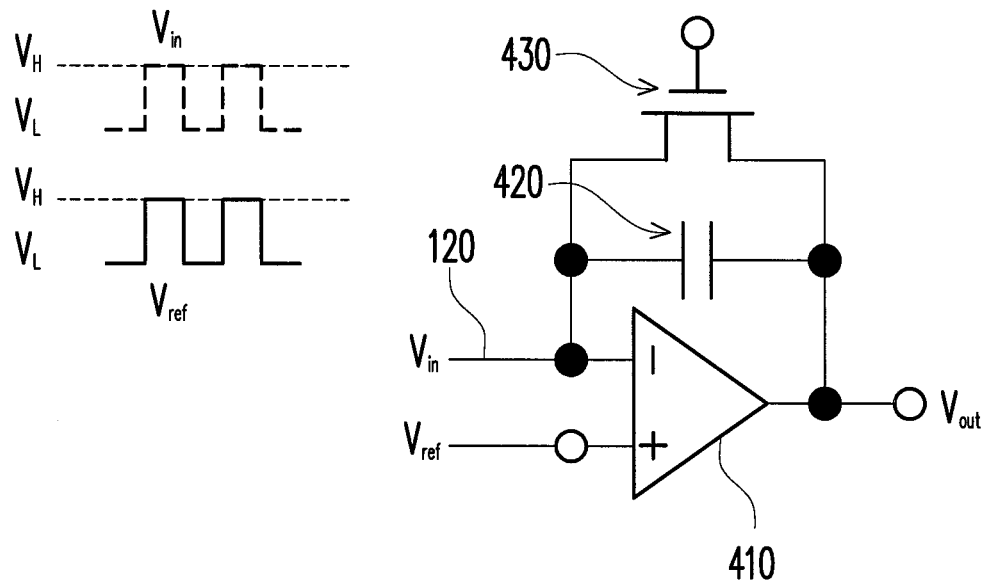
FIG. 4 is a partial schematic circuit diagram illustrating another embodiment of the interpretation unit in FIG. 1.

FIG. 4 is a partial schematic circuit diagram illustrating another embodiment of the interpretation unit in FIG. 1. Referring to FIG. 1 and FIG. 4, in the present embodiment, the interpretation unit 400 includes the same components as those in the embodiment of FIG. 3. As the inverting input terminal and the non-inverting input terminal of the operational amplifier 410 are virtually connected, an input signal $V_{in}$ of the inverting input terminal is corresponding to the reference voltage $V_{ref}$. That is, the interpretation unit 400 provides a virtual bias, and a relation between the input signal $V_{in}$ of the inverting input terminal and the reference voltage $V_{ref}$ is as follows:

$$V_{in}=V_{ref}=V_H-V_L$$

Figure 5:
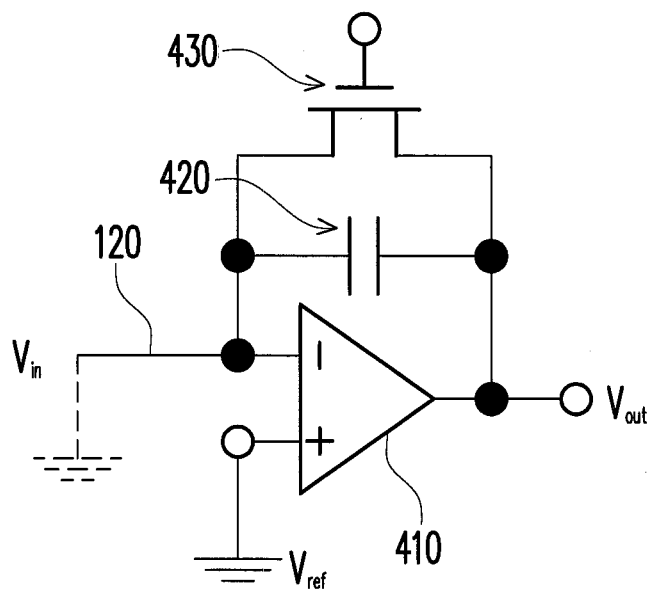
FIG. 5 is a partial schematic circuit diagram illustrating another embodiment of the interpretation unit in FIG. 1.

FIG. 5 is a partial schematic circuit diagram illustrating another embodiment of the interpretation unit in FIG. 1. Referring to FIG. 1 and FIG. 5, in this embodiment, the interpretation unit 400 includes the same components as those in the embodiment of FIG. 3, but the non-inverting input terminal of the operational amplifier 410 is grounded. The circuit configuration of the interpretation unit 400 in FIG. 5 is applicable to subsequent embodiments of FIG. 8 to FIG. 12. As the inverting input terminal and the non-inverting input terminal of the operational amplifier 410 are virtually connected, an input signal $V_{in}$ of the inverting input terminal is corresponding to the reference voltage $V_{ref}$. That is, the interpretation unit 400 provides a virtual ground, and a relation between the input signal $V_{in}$ of the inverting input terminal and the reference voltage $V_{ref}$ is as follows:

$$V_{in}=V_{ref}=0$$

Referring to FIG. 6, after the cycle of the read time interval, that is, after all the sensing devices 200 of the same column are read, in the time interval P1, that is, the reset time interval, the implementation of the disclosure may also provide the reference voltage $V_{ref}$ to all columns of the sensing apparatus 100 at the same time, so as to reset all the sensing devices 200 in all the columns at the same time. That is, voltages on the contacts 205 of the storage units 220 of all the sensing devices 200 are reset to 0 V.

In another embodiment, in the reset time interval of the time interval P1, the implementation of the disclosure may also provide the reference voltage $V_{ref}$ to the sensing apparatus 100 of different columns in sequence, and the present disclosure does not illustrate a waveform diagram of the embodiment. A next sensing cycle is started after the time interval P1.

Figure 7:
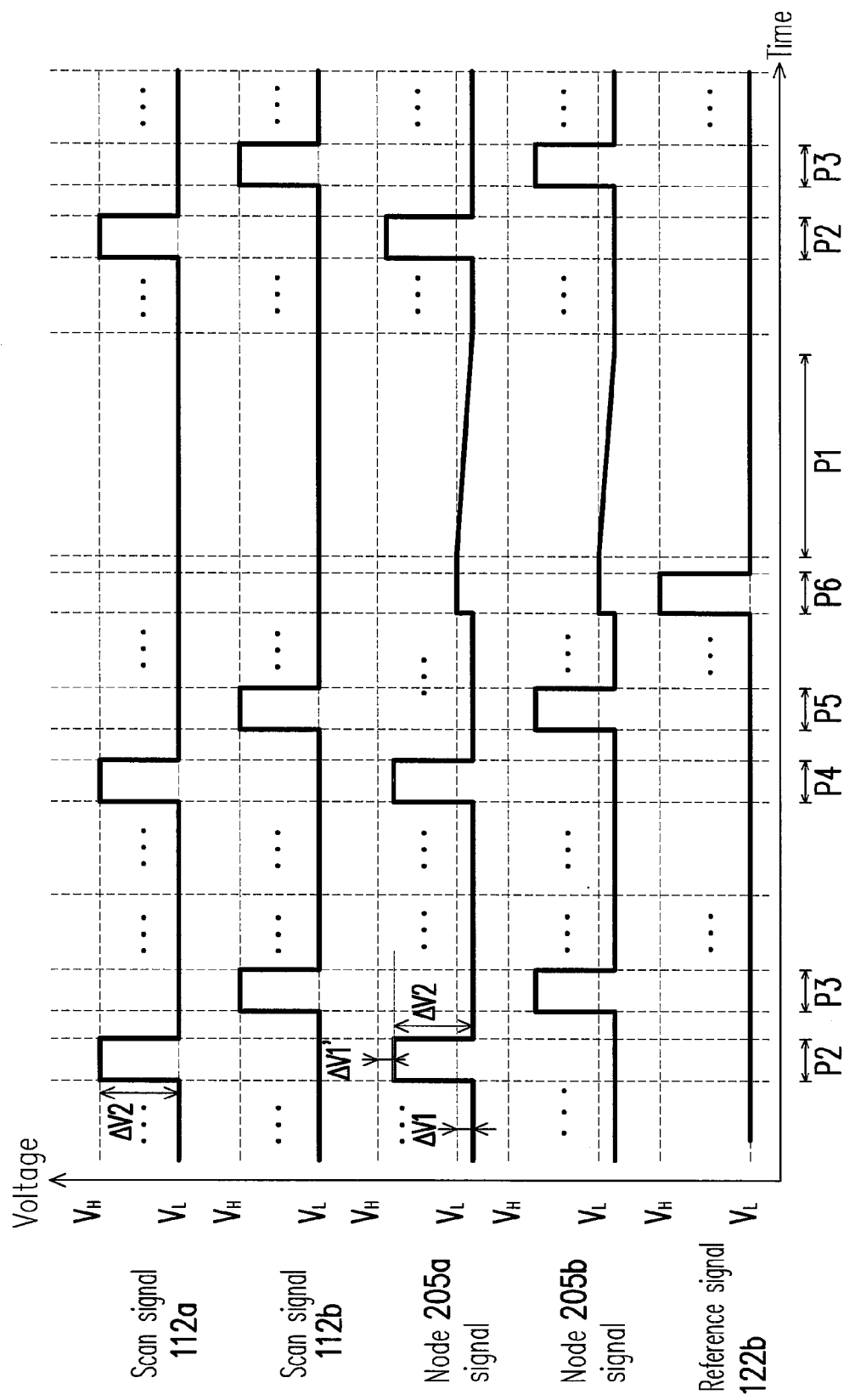
FIG. 7 is a waveform diagram of the sensing apparatus of FIG. 1 according to a second embodiment.

FIG. 7 is a waveform diagram of the sensing apparatus of FIG. 1 according to a second embodiment. A plurality of waveforms of FIG. 7 illustrate a driving method of the sensing apparatus 100 at the same time. In addition, in the embodiments of FIG. 6 and FIG. 7, the interpretation unit 400 adopts the circuit configuration as shown in the embodiment of FIG. 4, and reference signals 122 in a pulse form are provided to the readout lines 120 in a preset time interval. Referring to FIG. 7, the time intervals P2 and P3 are read time intervals in the same frame, and the time intervals P4 and P5 are read time intervals in the same frame. In fact, in the present embodiment, a plurality of cycles of the read time interval may be carried out followed by a single reset operation, that is, a read frame operation may be performed for multiple times before the time interval P1. Thus, a plurality of frames that is read can be averaged, so as to reduce the influence of noises on the sensing device 200 in the sensing time interval. Similar to the embodiment of FIG. 6, in the time interval P1, that is, the reset time interval, the implementation of the present disclosure may also provide the reference signal 122 to all columns of the sensing apparatus 100 at the same time, so as to reset all sensing devices 200 in all the columns at the same time. That is, voltages on the contacts 205 of the storage units 220 of all the sensing devices 200 are reset to 0 V. Moreover, in another embodiment, in the reset time interval of the time interval P1, the implementation of the present disclosure may also provide the reference signal 122 to the sensing apparatus 100 of different columns in sequence, and the present disclosure does not illustrate a waveform diagram of the embodiment. A next sensing cycle is started after the time interval P1.

In the embodiment of FIG. 7, other detailed operation modes of the sensing device 200*b*, may be referred to the aforementioned description of the operation mode of the sensing device 200*a*, where the function of the scan signal 112*a* received by the sensing device 200*a* is equivalent to that of the scan signal 112*b* received by the sensing device 200*b*.

A signal of the contact 205*b* of the sensing device 200*b* and a signal of the contact 205 of a next-level sensing device 200 may be referred to signals as illustrated in FIG. 7. The time interval P2 of FIG. 7 is a read time interval of the sensing device 200*a* in a frame n (that is, a time interval configured for outputting the readout signal R1), and the time interval P3 of FIG. 7 is a read time interval of the sensing device 200*b* in the frame n (that is, a time interval configured for outputting the readout signal R2). The time interval P4 of FIG. 7 is a read time interval of the sensing device 200*a* in a frame n+1, and the time interval P5 of FIG. 7 is a read time interval of the sensing device 200*b* in the frame n+1. The time interval P6 after the time interval P5 of FIG. 7 is a reset time interval of all sensing devices 200*b* of the same column. Other details may be referred to the aforementioned description of the sensing device 200*a*, and will not be described herein again.

The circuit structures and operation modes of the sensing device 200*c*, the sensing device 200*d* and other sensing devices 200 can be referred to the aforementioned detailed description of the circuit structures and operation modes of the sensing device 200*a* and the sensing device 200*b*, and will not be described herein again.

Figure 8:
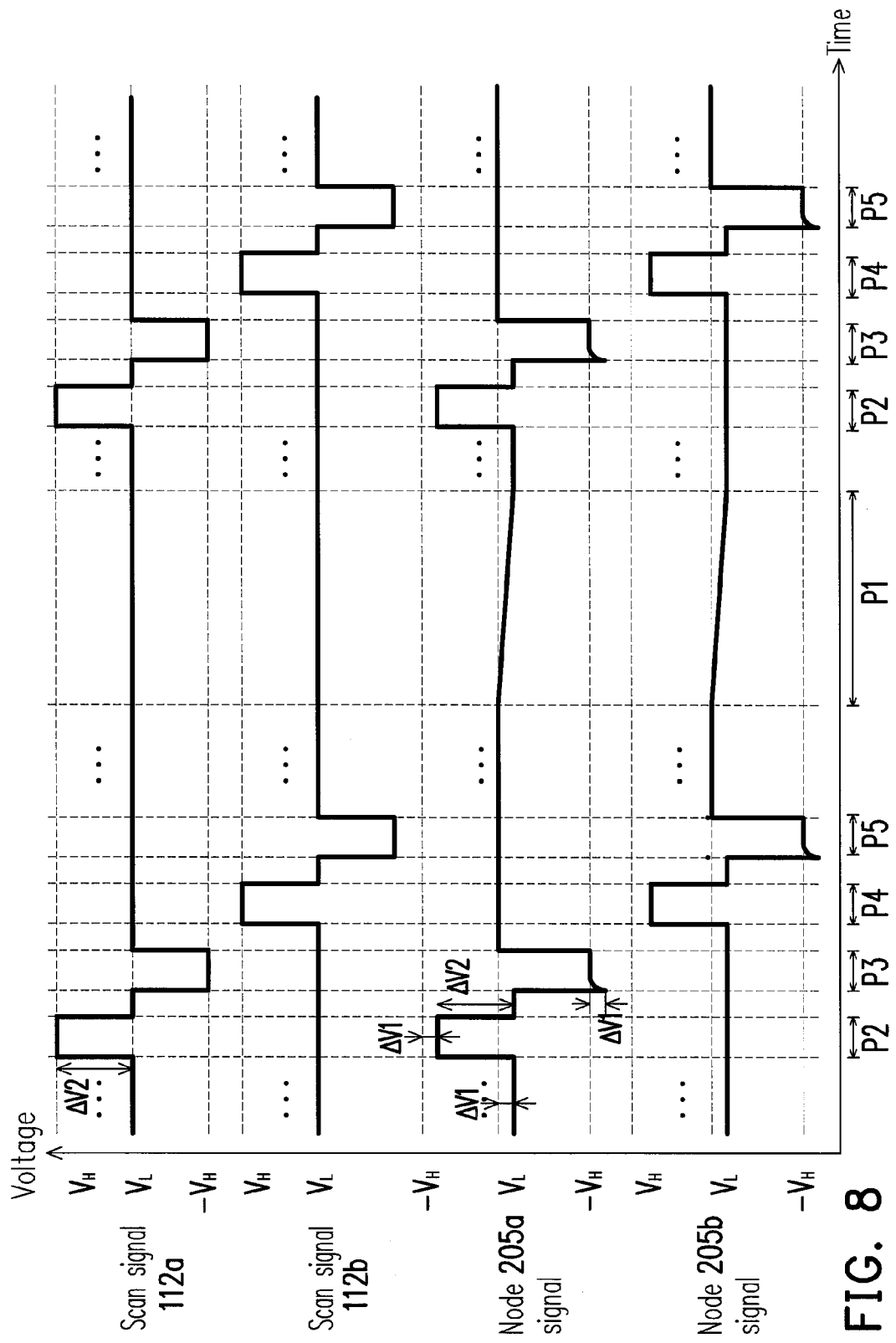
FIG. 8 is a waveform diagram of the sensing apparatus of FIG. 1 according to a third embodiment.

FIG. 8 is a waveform diagram of the sensing apparatus of FIG. 1 according to a third embodiment. A plurality of waveforms of FIG. 8 illustrate a driving method of the sensing apparatus 100 at the same time. In the embodiment of FIG. 8, the interpretation unit 400 adopts the circuit configuration as shown in the embodiment of FIG. 5, and provides a virtual ground reference voltage $V_{ref}$ to the readout lines 120. Referring to FIG. 8, in the present embodiment, after using the scan signals 112 to enable a plurality of sensing devices 200 in the same row, the driving method directly resets the sensing devices 200 in the same row, and then enables and resets a plurality of sensing devices 200 in a next row in sequence. More specifically, in the time interval P2, which is the read time interval, the driving method uses a positive voltage pulse scan signal 112 to enable the sensing devices 200 in the same row. In the time interval P3 after the time interval P2, which is the reset time interval, the driving method uses another negative voltage pulse scan signal 112 to reset the sensing devices 200 in the same row. In the present embodiment, the scan signals 112 are transmitted by the driving unit 300 electrically connected to the scan lines 110.

Referring to FIG. 8, in the present embodiment, when the time interval P2 is entered, and the scan signal 112*a* of the scan line 110*a* is increased from the low voltage level $V_L$ to the high voltage level $V_H$, the voltage variation is ΔV2, and the scan signal 112*a* enables the voltage of the contact 205*a* to increase to a voltage of ΔV2+ΔV1 by a capacitive coupling effect of the storage unit 220 of the sensing device 200*a* (in the present embodiment, ΔV1 is, for example, a negative value). The reason is that in a detection stage of a previous cycle, a charge data signal stored by the storage unit 220 in the sensing device 200*a* at this time is a negative voltage ΔV1, that is, the second terminal T5 (that is, the contact 205*a*) of the storage unit 220 is at a negative voltage potential of ΔV1 in the detection stage of the previous cycle. Therefore, the voltage of the contact 205a in the time interval P2 is ΔV2+ΔV1 due to the capacitive coupling effect.

For example, in the time interval P3 of FIG. 8, the scan signal 112a on the scan line 110a is in a negative voltage level $-V_H$, and the potential of the reference voltage $V_{ref}$ on the readout line 120b is 0 V, and at this time, the scan signal 112a and the reference voltage $V_{ref}$ enable the reset unit 240 to be in the on state.

To be illustrated in more detail, in the time interval P3, the time interval P3 is corresponding to a reset time interval of all the sensing devices 200. For example, when the scan signal 112a is in the negative voltage level $-V_H$, and the reference voltage $V_{ref}$ on the readout line 120b is in the low voltage level $V_L$, the reference voltage $V_{ref}$ is transmitted to the control terminal T7 of the reset unit 240 to enable the reset unit 240 to be in the on state, such that the contact 205a and the scan signal 112a are also in the low voltage level $V_L$. Thus, the scan line 110a and the contact 205a are both in the low voltage level $V_L$, so that substantially no charge accumulates on the storage unit 220, thereby achieving the effect of resetting the storage unit 220 by the reference signal 122b on the readout line 120b. At this time, the control terminal T2 of the amplification unit 230 is also in the low voltage levl $V_L$, and accordingly the amplification unit 230 is in the off state, such that the current output terminal T3 of the amplification unit 230 does not output a current signal to the readout line 120b. The time interval P1 after the time interval P3 of FIG. 8 is a sensing time interval for all the sensing devices 200. A next sensing cycle is started after the time interval P1 of FIG. 8.

Two scan signals 112 in the time interval P2 and the time interval P3 in FIG. 8 are bipolar scan pulses. In the present embodiment, for a plurality of sensing devices 200 in the same row, respectively in the time interval P2 and the time interval P3, a positive voltage pulse scan signal 112 may be configured to enable the sensing devices 200 in the same row in sequence, and another negative voltage pulse scan signal 112 may be configured to reset the sensing devices 200 in the same row. As described previously, such a driving mode does not require any additional reset line or bias line, and may read and reset a plurality of sensing devices 200 in the same row sequentially row by row, thereby facilitating reading frames.

In the embodiment of FIG. 8, other detailed operation modes of the sensing device 200b may be referred to the aforementioned description of the operation mode of the sensing device 200a, where the function of the scan signal 112a received by the sensing device 200a is equivalent to that of the scan signal 112b received by the sensing device 200b.

A signal of the contact 205b of the sensing device 200b and a signal of the contact 205 of a next-level sensing device 200 may be referred to signals illustrated in FIG. 8. The time interval P2 of FIG. 8 is a read time interval of the sensing device 200a (that is, time interval for outputting the readout signal R1), and the time interval P3 of FIG. 8 is a reset time interval of the sensing device 200a. The time interval P4 of FIG. 8 is a read time interval of the sensing device 200b (that is, a time interval configured for outputting the readout signal R2), and the time interval P5 of FIG. 8 is a reset time interval of the sensing device 200b. The time interval P1 after the time interval P5 of FIG. 8 is a sensing time interval for all sensing devices 200b of the same column. Other details may be referred to the aforementioned description of the sensing device 200a, and will not be described herein again.

The circuit structures and operation modes of the sensing device 200c, the sensing device 200d and other sensing devices 200 can be referred to the aforementioned detailed description of the circuit structures and operation modes of the sensing device 200a and the sensing device 200b, and will not be described herein again.

Figure 9:
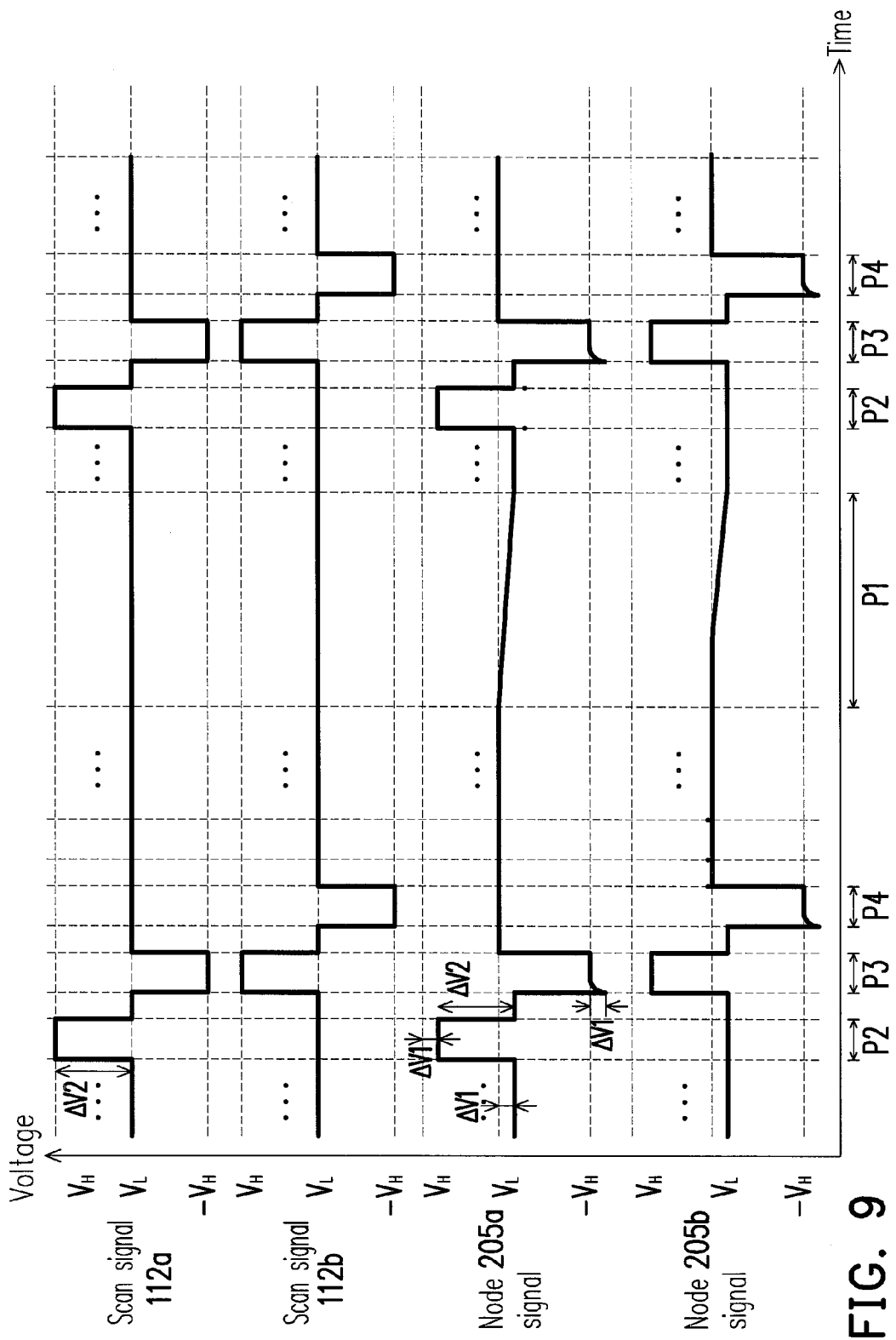
FIG. 9 is a waveform diagram of the sensing apparatus of FIG. 1 according to a fourth embodiment.

FIG. 9 is a waveform diagram of the sensing apparatus of FIG. 1 according to a fourth embodiment. A plurality of waveforms of FIG. 9 illustrates a driving method of the sensing apparatus 100 at the same time. In the embodiment of FIG. 9, the interpretation unit 400 adopts the circuit configuration as shown in the embodiment of FIG. 5, and provides a virtual ground reference voltage $V_{ref}$ to the readout lines 120. Referring to FIG. 9, in the present embodiment, the driving method is similar to the driving method of FIG. 8, both of which adopt bipolar scan pulses to respectively enable and reset the sensing devices 200, but FIG. 8 and FIG. 9 are slightly different in time sequence.

Briefly, in the embodiment of FIG. 9, when a previous-level sensing device 200a is reset, the sensing device 200b is enabled. As the sensing device 200a and the sensing device 200b are enabled or reset respectively in response to the scan signal 112a and the scan signal 112b, the reset time interval and the read time interval of two neighboring sensing devices 200 may overlap. Thus, the total amount of time required for sensing may be reduced. To be illustrated in more detail, a signal of the contact 205b of the sensing device 200b and a signal of the contact 205 of a next-level sensing device 200 may be as illustrated in FIG. 9. The time interval P2 of FIG. 9 is a read time interval of the sensing device 200a (that is, a time interval configured for outputting the readout signal R1); the time interval P3 of FIG. 9 is a reset time interval of the sensing device 200a, and the time interval P3 is also a read time interval of the sensing device 200b (that is, a time interval configured for outputting the readout signal R2); the time interval P4 of FIG. 9 is a reset time interval of the sensing device 200b. The time interval P1 after the time interval P4 of FIG. 9 is a sensing time interval of all sensing devices 200b of the same column. A next sensing cycle is started after the time interval P1 of FIG. 9. Other details may be referred to the aforementioned description of the sensing device 200a, and will not be described herein again.

In the embodiment of FIG. 9, other detailed operation modes of the sensing device 200b may be referred to the aforementioned description of the operation mode of the sensing device 200a, where the function of the scan signal 112a received by the sensing device 200a is equivalent to that of the scan signal 112b received by the sensing device 200b. The circuit structures and operation modes of the sensing device 200c, the sensing device 200d and other sensing devices 200 can be referred to the aforementioned detailed description of the circuit structures and operation modes of the sensing device 200a and the sensing device 200b, and will not be described herein again.

Figure 10:
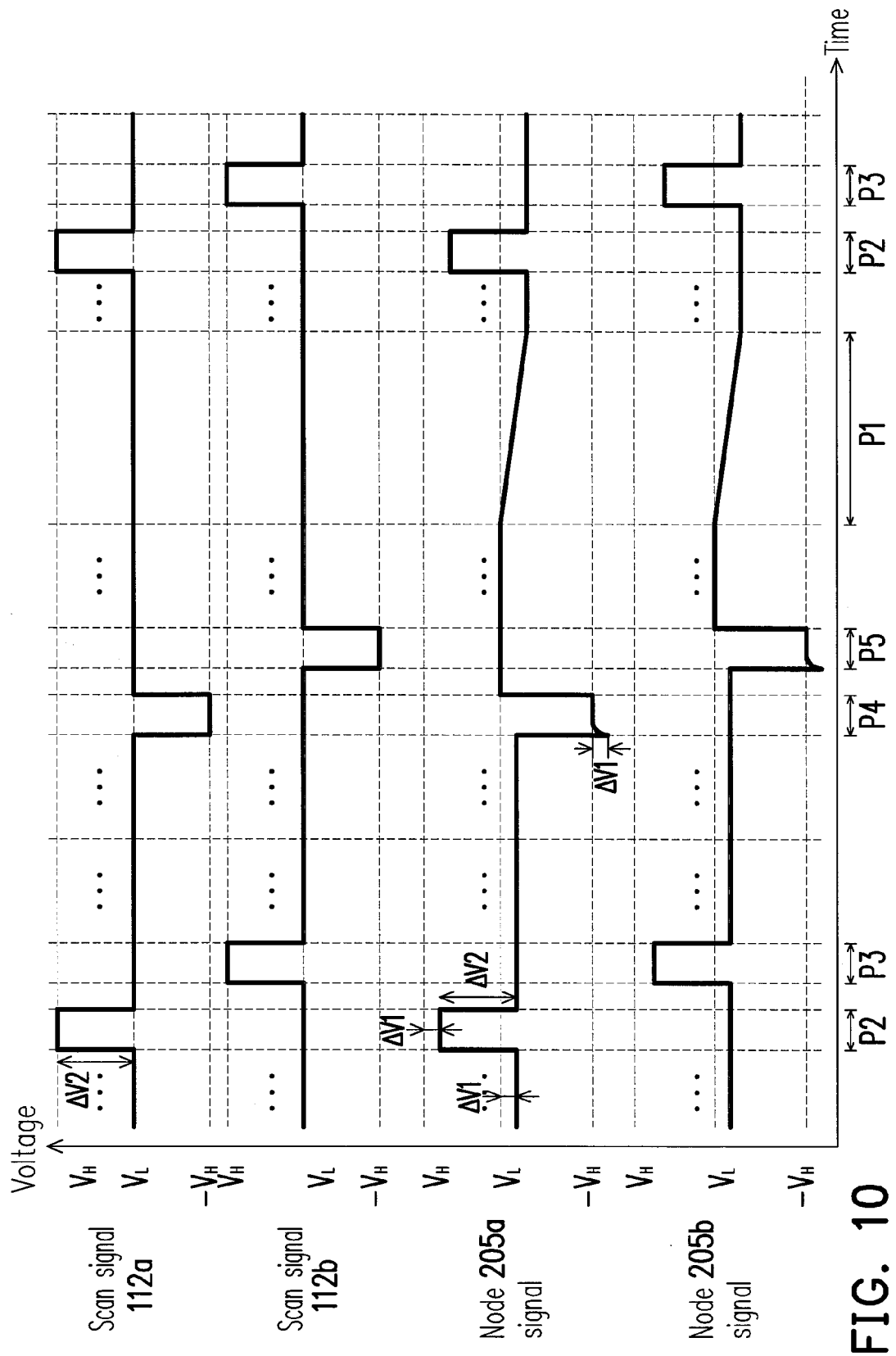
FIG. 10 is a waveform diagram of the sensing apparatus of FIG. 1 according to a fifth embodiment.

FIG. 10 is a waveform diagram of the sensing apparatus of FIG. 1 according to a fifth embodiment. A plurality of waveforms of FIG. 10 illustrates a driving method of the sensing apparatus 100 at the same time. In the embodiment of FIG. 10, the interpretation unit 400 adopts the circuit configuration as shown in the embodiment of FIG. 5, and provides a virtual ground reference voltage $V_{ref}$ to the readout lines 120. Referring to FIG. 10, in this embodiment, the driving method is similar to the driving method of FIG. 8, and adopts a positive voltage pulse scan signal and a negative voltage pulse scan signal to respectively enable and reset the sensing devices 200, but FIG. 8 and FIG. 10 are different in time sequence.

Briefly, in the driving method of FIG. 10, when the sensing devices 200 in a plurality of rows are enabled in sequence in one frame for reading, the sensing devices 200 in a plurality of rows are reset in sequence in another frame. In other words, the driving method of FIG. 10 separates read frames from reset frames. To be illustrated in more detail, a signal of the contact 205b of the sensing device 200b and a signal of the contact 205 of a next-level sensing device 200 may be as illustrated in FIG. 10. The time interval P2 of FIG. 10 is a read time interval of the sensing device 200a in a read frame (that is, a time interval configured for outputting the readout signal R1), and the time interval P3 of FIG. 10 is a read time interval of the sensing device 200b in the read frame (that is, a time interval configured for outputting the readout signal R2). The time interval P4 after the time interval P3 of FIG. 10 is a reset time interval of the sensing device 200a in a reset frame, and the time interval P5 of FIG. 10 is a reset time interval of the sensing device 200b. The time interval P1 after the time interval P5 of FIG. 10 is a sensing time interval of all sensing devices 200b of the same column. A next sensing cycle is started after the time interval P1 of FIG. 10. Other details may be referred to the aforementioned description of the sensing device 200a, and will not be described herein again.

In the embodiment of FIG. 10, other detailed operation modes of the sensing device 200b, reference may be referred to the aforementioned description of the operation mode of the sensing device 200a, where the function of the scan signal 112a received by the sensing device 200a is equivalent to that of the scan signal 112b received by the sensing device 200b. The circuit structures and operation modes of the sensing device 200c, the sensing device 200d and other sensing devices 200 can be referred to the aforementioned detailed description of the circuit structures and operation modes of the sensing device 200a and the sensing device 200b, and will not be described herein again.

Figure 11:
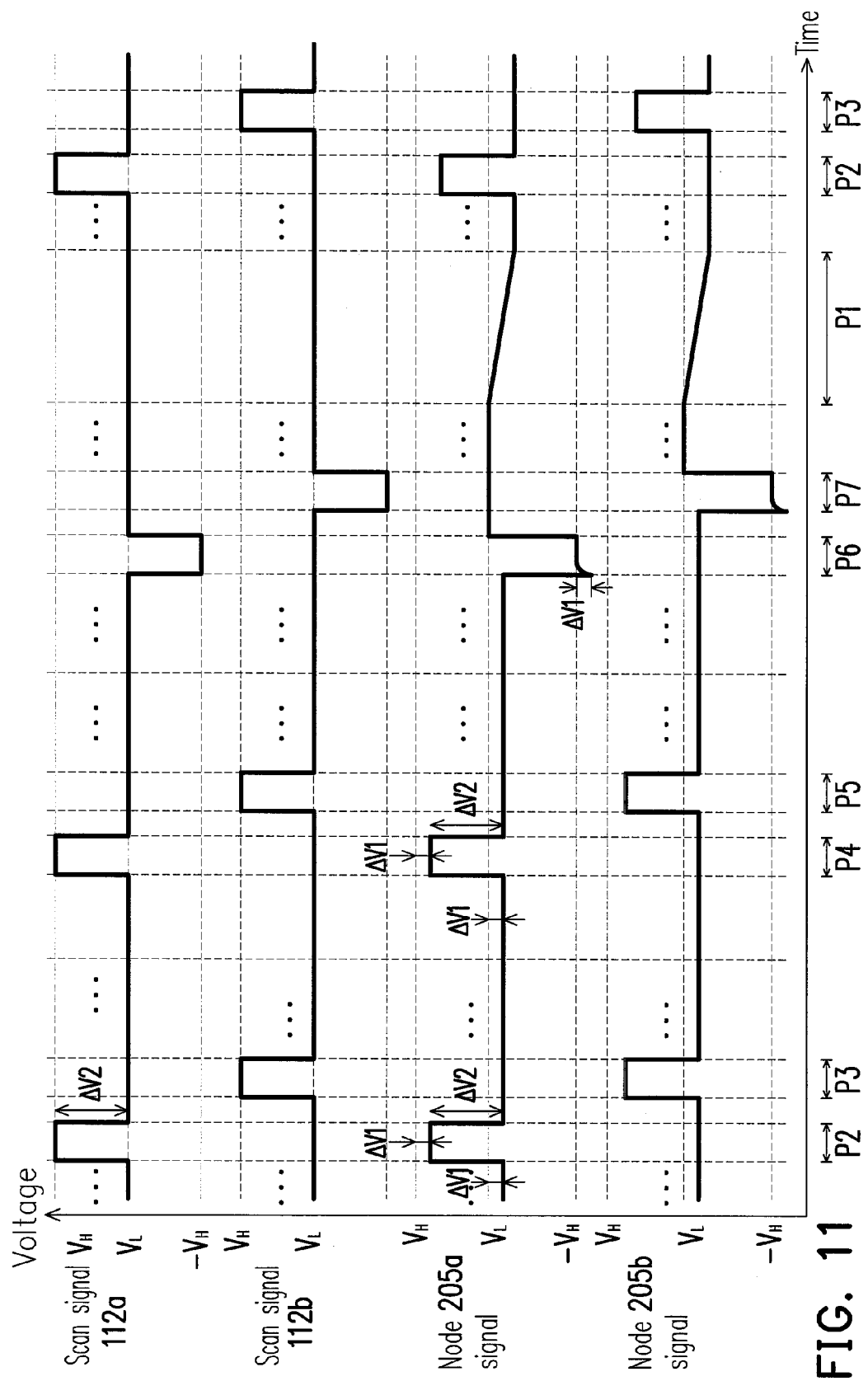
FIG. 11 is a waveform diagram of the sensing apparatus of FIG. 1 according to a sixth embodiment.

FIG. 11 is a waveform diagram of the sensing apparatus of FIG. 1 according to a sixth embodiment. A plurality of waveforms of FIG. 11 illustrates a driving method of the sensing apparatus 100 at the same time. In the embodiment of FIG. 11, the interpretation unit 400 adopts the circuit configuration as shown in the embodiment of FIG. 5, and provides a virtual ground reference voltage $V_{ref}$ to the readout lines 120. Referring to FIG. 11, in the present embodiment, the driving method is similar to the driving method of FIG. 10, adopts a positive voltage pulse scan signal in a read frame to enable the sensing devices 200, and adopts a negative voltage pulse scan signal in a reset frame to reset the sensing devices 200, but the driving method of FIG. 11 first enables the sensing devices 200 in a plurality of rows in sequence in a plurality of read frames to obtain the readout signals R of the sensing devices 200, and merely resets the sensing devices 200 in the rows in sequence in a reset frame after the read frames.

To be illustrated in more detail, a signal of the contact 205b of the sensing device 200b and a signal of the contact 205 of a next-level sensing device 200 may be as illustrated in FIG. 11. The time interval P2 of FIG. 11 is a read time interval of the sensing device 200a in a read frame n (that is, a time interval configured for outputting the readout signal R1), and the time interval P3 of FIG. 11 is a read time interval of the sensing device 200b in the read frame n (that is, a time interval configured for outputting the readout signal R2). The time interval P4 after the time interval P3 of FIG. 11 is a read time interval of the sensing device 200a in a read frame n+1, and the time interval P5 of FIG. 11 is a read time interval of the sensing device 200b in the read frame n+1. The time interval P6 after the time interval P5 of FIG. 11 is a reset time interval of the sensing device 200a in a reset frame, and the time interval P7 of FIG. 11 is a reset time interval of the sensing device 200b. The time interval P1 after the time interval P7 of FIG. 11 is a sensing time interval of all sensing devices 200, and a next sensing cycle is started after the time interval P1.

As described previously, a read frame operation may be performed for multiple times before the time interval P6 of FIG. 11. Thus, a plurality of frames that is read can be averaged, so as to reduce the influence of noise on the sensing device 200 in the sensing time interval. Other details may be referred to the aforementioned description of the sensing device 200a, and will not be described herein again.

In the embodiment of FIG. 11, other detailed operation modes of the sensing device 200b may be referred to the aforementioned description of the operation mode of the sensing device 200a, where the function of the scan signal 112a received by the sensing device 200a is equivalent to that of the scan signal 112b received by the sensing device 200b. The circuit structures and operation modes of the sensing device 200c, the sensing device 200d and other sensing devices 200 can be referred to the aforementioned detailed description of the circuit structures and operation modes of the sensing device 200a and the sensing device 200b, and will not be described herein again.

Figure 12:
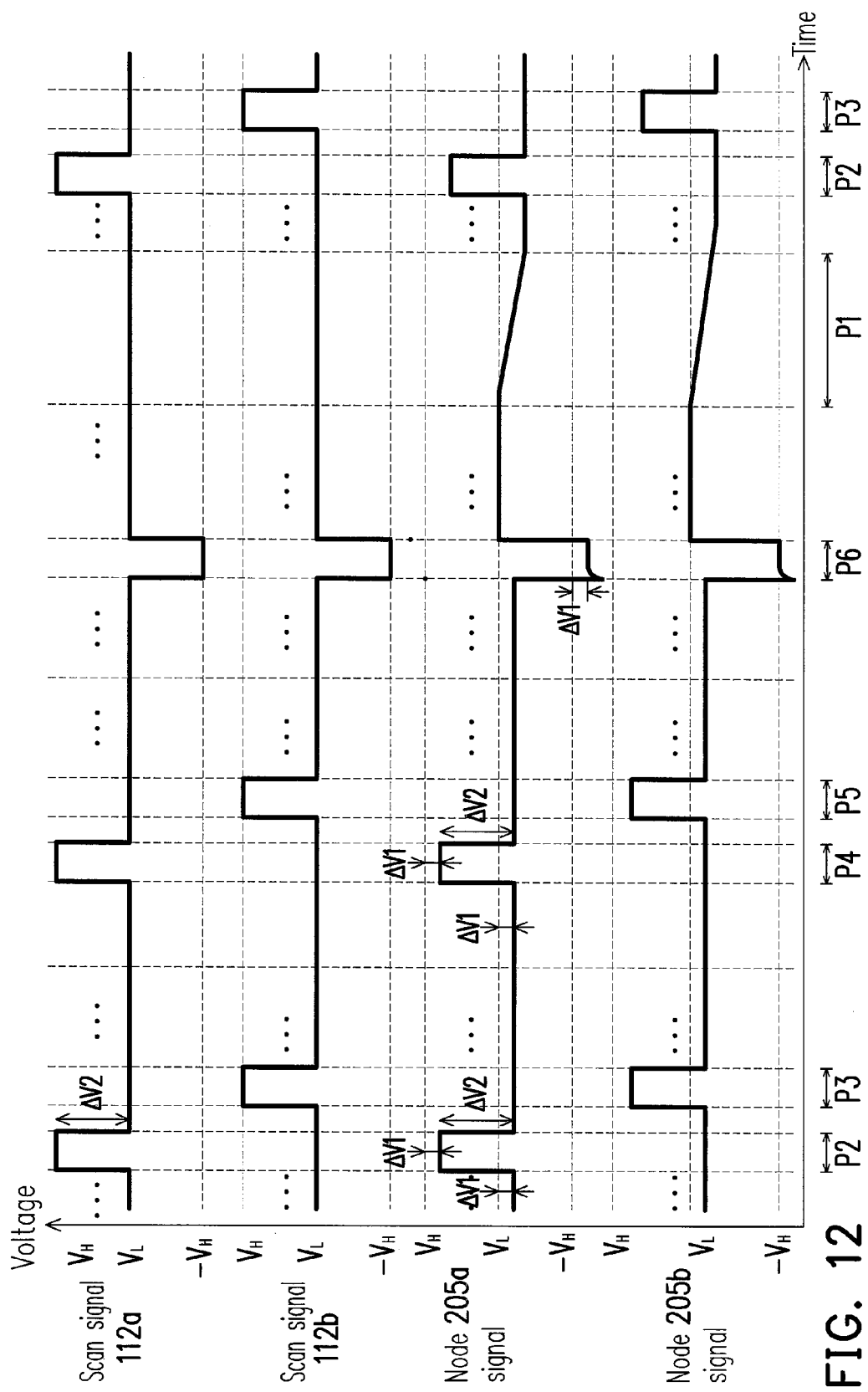
FIG. 12 is a waveform diagram of the sensing apparatus of FIG. 1 according to a seventh embodiment.

FIG. 12 is a waveform diagram of the sensing apparatus of FIG. 1 according to a seventh embodiment. A plurality of waveforms of FIG. 12 illustrates a driving method of the sensing apparatus 100 at the same time. In the embodiment of FIG. 12, the interpretation unit 400 adopts the circuit configuration as shown in the embodiment of FIG. 5, and provides a virtual ground reference voltage $V_{ref}$ to the readout lines 120. Referring to FIG. 12, in the present embodiment, the driving method is similar to the driving method of FIG. 10, adopts a positive voltage pulse scan signal in a read frame to enable the sensing devices 200, and adopts a negative voltage pulse scan signal in a reset frame to reset the sensing devices 200, but the driving method of FIG. 12 firstly enables the sensing devices 200 in a plurality of rows in sequence in a plurality of read frames to obtain the readout signals R of the sensing devices 200, and merely resets all sensing devices 200 in the same column at the same time in a reset frame after the read frames.

To be illustrated more clearly, a contact 205b signal of the sensing device 200b and a contact 205 signal of a next-stage sensing device 200 may be as illustrated in FIG. 12. The time interval P2 of FIG. 12 is a read time interval of the sensing device 200a in a read frame n (that is, a time interval configured for outputting the readout signal R1), and the time interval P3 of FIG. 12 is a read time interval of the sensing device 200b in the read frame n (that is, a time interval configured for outputting the readout signal R2). The time interval P4 after the time interval P3 of FIG. 12 is a read time interval of the sensing device 200a in a read frame n+1, and the time interval P5 of FIG. 12 is a read time interval of the sensing device 200b in the read frame n+1. The time interval P6 after the time interval P5 of FIG. 12 is a reset time interval of all sensing devices 200 in the same column. The time interval P1 after the time interval P6 of FIG. 12 is a sensing time interval of all sensing devices 200, and a next sensing cycle is started after the time interval P1.

As described previously, a read frame operation may be performed for multiple times before the time interval P6 of FIG. 12. Thus, a plurality of frames that is read can be averaged, so as to reduce the influence of noises on the sensing device 200 in the sensing time interval. Other details may be referred to the aforementioned description of the sensing device 200a, and will not be described herein again.

In the embodiment of FIG. 12, other detailed operation modes of the sensing device 200b may be referred to the aforementioned description of the operation mode of the sensing device 200a, where the function of the scan signal 112a received by the sensing device 200a is equivalent to that of the scan signal 112b received by the sensing device 200b.

The circuit structures and operation modes of the sensing device 200c, the sensing device 200d and other sensing devices 200 can be referred to the aforementioned detailed description of the circuit structures and operation modes of the sensing device 200a and the sensing device 200b, and will not be described herein again.

Figure 13:
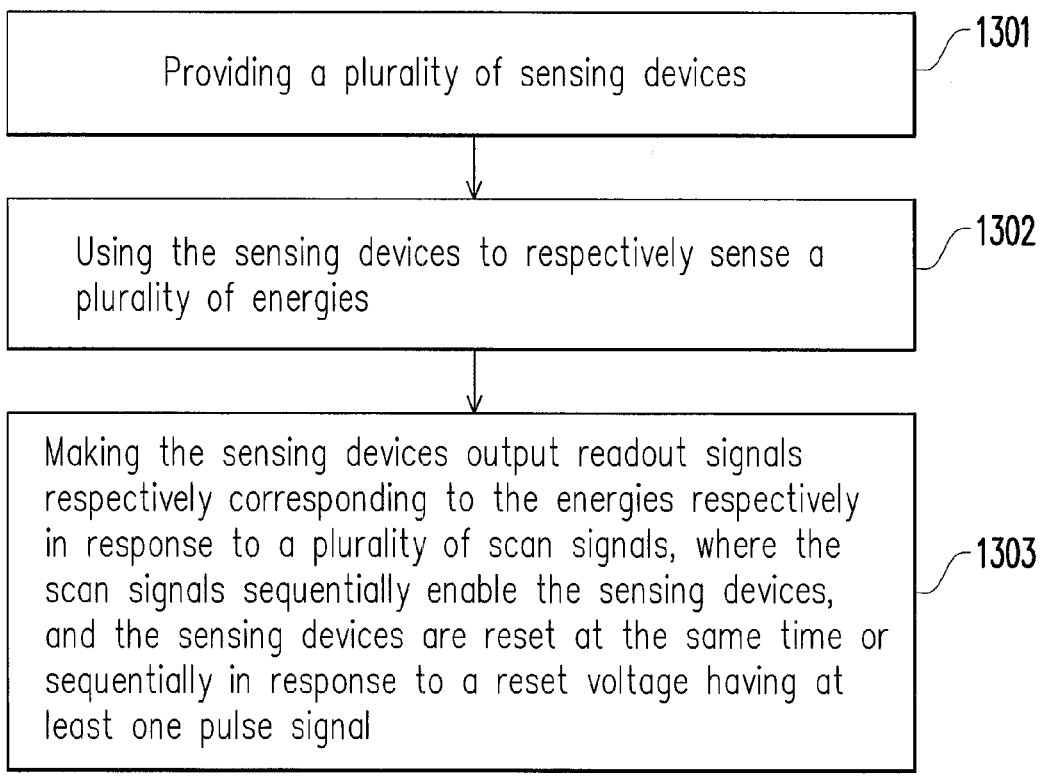
FIG. 13 is a flowchart illustrating a sensing method of the sensing apparatus of FIG. 1 according to an embodiment.

FIG. 13 is a flowchart illustrating a sensing method of the sensing apparatus of FIG. 1 according to an embodiment. Referring to FIG. 1 and FIG. 13, the sensing method of the present embodiment may be implemented by the sensing apparatus 100 of FIG. 1. The sensing method of the present embodiment includes the following steps. In Step 1301, a plurality of sensing devices 200 is provided in the sensing apparatus 100. For example, the sensing devices 200a, 200b, 200c and 200d of FIG. 1 and other sensing devices 200 may be provided. In Step 1302, the sensing devices 200 are configured to respectively sense a plurality of energies E. For example, the sensing device 200a and the sensing device 200b may be configured to respectively sense an energy E1 and an energy E2, and here, the sensing device 200a and the sensing device 200b respectively represent a first pixel and a second pixel.

In Step 1303, the sensing devices 200 are enabled to output readout signals R respectively corresponding to the energies E respectively in response to a plurality of scan signals 112. For example, a first sensing device 200(a) is enabled to output a readout signal R1 corresponding to the energy E1 in response to a first scan signal 112a transmitted on a first scan line 110a; a second sensing device 200(b) is enabled to output a readout signal R1 corresponding to the energy E1 in response to a second scan signal 112b transmitted on a second scan line 110b. In the present embodiment, the scan signals 112 enable the sensing devices 200 in sequence, and the sensing devices 200 are reset at the same time or in sequence in response to a reset voltage having one or more pulse signals. For example, the first sensing device 200(a) and the second sensing device 200(b) are reset at the same time or in sequence in response to a reset voltage having one or more pulse signals transmitted on the first scan line 110a and the second scan line 110b, respectively. For example, the first sensing device 200(a) and the second sensing device 200(b) are reset at the same time or in sequence in response to a reset voltage having one or more pulse signals transmitted on the readout line 120b. It is noted that the first scan signal 112a, which enables the first sensing device 200(a) to output the readout signal R1, and the reset voltage, which resets the first sensing device 200(a), are transmitted to the first sensing device 200(a) at different times. Similarly, the second scan signal 112b, which enables the second sensing device 200(b) to output the readout signal R2, and the reset voltage, which resets the second sensing device 200(b), are transmitted to the second sensing device 200(b) at different times.

For example, the reset voltage having one or more pulse signals may be corresponding to the embodiments of FIG. 6 to FIG. 7, a plurality of sensing devices 200 is reset at the same time or in sequence in response to a reference signal 122 (reset voltage) having a pulse signal on the readout line 120. Alternatively, the reset voltage having at least one pulse signal may be corresponding to the embodiments of FIG. 8 to FIG. 12, and a plurality of sensing devices 200 are reset at the same time or in sequence in response to a reference voltage $V_{ref}$ (reset voltage) being a low voltage on the readout line 120 in cooperation with a scan signal 112 (reset voltage) having a negative voltage pulse on the scan line 110 corresponding to each sensing device 200.

For example, the sensing device 200a is enabled to output a readout signal R1 corresponding to the energy E1 in response to a scan signal 112a, and the sensing device 200b is enabled to output a readout signal R2 corresponding to the energy E2 in response to a scan signal 112b.

The step of enabling the sensing device 200a to output the readout signal R1 corresponding to the energy E1 in response to the scan signal 112a includes the following steps. Firstly, the sensed energy E1 is converted to a data signal. Then, the data signal is stored, for example, the storage unit 220 of the sensing device 200a is configured to store the data signal, that is, the data signal is stored in the form of a voltage difference ΔV1. Further, the readout signal R1 corresponding to the data signal is output in response to the scan signal 112a, which is, for example, completed by the amplification unit 230 of the sensing device 200a.

Likewise, the step of enabling the sensing device 200b to output the readout signal R2 corresponding to the energy E2 in response to the scan signal 112b includes the following steps. Firstly, the sensed energy E2 is converted to a data signal. Then, the data signal is stored, for example, the storage unit 220 of the sensing device 200b is configured to store the data signal, that is, the data signal is stored in the form of a voltage difference ΔV1. Further, the readout signal R2 corresponding to the data signal is output in response to the scan signal 112b, which is, for example, completed by the amplification unit 230 of the sensing device 200b.

Furthermore, the step of resetting the sensing devices 200 at the same time or in sequence in response to the reset voltage having one or more pulse signals may include following procedures: when the scan signal 112a is in a low voltage level, the reference signal 122 on the readout line 120 is enabled to be at a high voltage, and the reset unit 240a of the sensing device 200a is turned on by the reference signal 122 so as to enable the storage unit 220a to reset the stored data signal, for example, the reset unit 240a of the sensing device 200a is turned on by using the reference signal 122, so as to reset the storage unit 220a of the sensing device 200a.

Likewise, the sensing device 200b may also be reset in response to a low-voltage level scan signal 112b and a high-voltage level reference signal 122. That is, when the scan signal 112b is in the low voltage level, the reference signal 122 on the readout line 120 is enabled to be in the high voltage level, and the reset unit 240b of the sensing device 200b is turned on by the reference signal 122 so as to enable the storage unit 220b to reset the stored data signal.

Other details of the sensing method of the present embodiment may be referred to the description of operation of the sensing apparatus 100 of FIG. 1, and the details will not be described herein again. In addition, the sensing method of the present embodiment may repeatedly execute Step 1302 and Step 1303, so as to achieve real time sensing. For example, when the energy E is light energy or electromagnetic energy, and when Step 1302 and Step 1303 are performed once, the sensing method may capture a static image. Moreover, when Step 1302 and Step 1303 are repeatedly executed, the sensing method may be configured to capture dynamic images.

In an embodiment, the step of resetting the sensing devices 200 at the same time or in sequence in response to the reset voltage having one or more pulse signals includes: executing a column reset procedure, where the column reset procedure is that when a first scan signal and a second scan signal are both in a low voltage level, the first scan signal resets the stored first data signal, and the second scan signal resets the stored second data signal, as enabled by a reference signal in a high voltage level provided by a readout line connected to both a first sensing device and a second sensing device.

In another embodiment, the step of resetting the sensing devices 200 at the same time or in sequence in response to the reset voltage having one or more pulse signals includes: executing a global reset procedure, where the global reset procedure is that when all scan signals in the sensing device are in a low voltage level, all the scan signals reset all data signals stored by all sensing devices 200 in the sensing apparatus 100, as enabled by a plurality of reference signals in a high voltage level provided by all readout lines 120 in the sensing device at the same time.

In still another embodiment, the step of resetting the sensing devices 200 at the same time or in sequence in response to the reset voltage having one or more pulse signals may include follow procedures: repeating a read frame procedure for at least two times, to obtain a plurality of readout signals of a plurality of frames. Each read frame procedure is enabling all sensing devices 200 in the sensing apparatus 100 to output the readout signals corresponding to a plurality of energies of the sensing devices 200 respectively in response to a plurality of corresponding scan signals; averaging the readout signals of the frames, to obtain a plurality of readout signals of an average frame; and after repeating the read frame procedure for at least two times, enabling the first sensing device and the second sensing device to be reset at the same time or in sequence in response to the reset voltage having one or more pulse signals.

In other embodiments, the step of resetting the sensing devices 200 at the same time or in sequence in response to the reset voltage having one or more pulse signals may include following procedures: when a reference voltage on a readout line connected to a first sensing device and a second sensing device is in a high voltage level, applying a positive voltage pulse scan signal through a first scan line connected to the first sensing device to enable the first sensing device, and continuing to apply a negative voltage pulse scan signal on the first scan line to reset the first sensing device; and after the first sensing device is reset, applying a positive voltage pulse scan signal through a second scan line connected to the second sensing device to enable the sensing devices, and continuing to apply a negative voltage pulse scan signal on the second scan line to reset the second sensing device.

In other embodiments, the step of resetting the sensing devices 200 at the same time or in sequence in response to the reset voltage having one or more pulse signals includes: when a reference voltage on a readout line connected to a first sensing device and a second sensing device is in a high voltage level, applying a first positive voltage pulse scan signal through a first scan line connected to the first sensing device to enable the first sensing device, and at the same time, applying a second positive voltage pulse scan signal through a second scan line connected to the second sensing device to enable the second sensing device; after the second sensing device is enabled, continuing to apply a first negative voltage pulse scan signal on the first scan line to reset the first sensing device; and after the first sensing device is reset, continuing to apply a second negative voltage pulse scan signal on the second scan line to reset the second sensing device.

In other embodiments, the step of resetting the sensing devices 200 at the same time or in sequence in response to the reset voltage having one or more pulse signals may include following procedures: when a reference voltage on a readout line connected to a first sensing device and a second sensing device is in a high voltage level, in a plurality of read time intervals of a read frame, applying a first positive voltage pulse scan signal through a first scan line connected to the first sensing device to enable the first sensing device, and after the first sensing device is enabled, applying a second positive voltage pulse scan signal through a second scan line connected to the second sensing device to enable the second sensing device; and in a plurality of reset time intervals of a reset frame after the read frame, applying a first negative voltage pulse scan signal through the first scan line connected to the first sensing device to reset the first sensing device, and after the first sensing device is reset, applying a second negative voltage pulse scan signal through the second scan line connected to the second sensing device to reset the second sensing device.

In other embodiments, the step of resetting the sensing devices 200 at the same time or in sequence in response to the reset voltage having one or more pulse signals may include following procedures: when a reference voltage on a readout line connected to a first sensing device and a second sensing device is in a high voltage level, repeating a read frame procedure for at least two times, to obtain a plurality of readout signals of a plurality of frames, wherein each read frame procedure includes applying a first positive voltage pulse scan signal through a first scan line connected to the first sensing device to enable the first sensing device, and after the first sensing device is enabled, applying a second positive voltage pulse scan signal through a second scan line connected to the second sensing device to enable the second sensing device; and in a plurality of reset time intervals of a reset frame after repeating the read frame procedure for at least two times, applying a first negative voltage pulse scan signal through the first scan line connected to the first sensing device to reset the first sensing device, and after the first sensing device is reset, applying a second negative voltage pulse scan signal through the second scan line connected to the second sensing device to reset the second sensing device.

In other embodiments, the step of resetting the sensing devices 200 at the same time or in sequence in response to the reset voltage having one or more pulse signals may include following procedures: when a reference voltage on a readout line connected to a first sensing device and a second sensing device is in a high voltage level, repeating a read frame procedure for at least two times, to obtain a plurality of readout signals of a plurality of frames, where each read frame procedure includes applying a first positive voltage pulse scan signal through a first scan line connected to the first sensing device to enable the first sensing device, and after the first sensing device is enabled, applying a second positive voltage pulse scan signal through a second scan line connected to the second sensing device to enable the second sensing device; and in a reset time interval of a reset frame after repeating the read frame procedure for at least two times, providing a plurality of negative voltage pulse scan signals at the same time through all scan lines to respectively reset all sensing devices in the sensing apparatus 100.

As the sensing method of the present embodiment can use scan signals or reset signals to drive and reset sensing devices, and may reset the sensing devices without using any additional reset line, the sensing method of the present embodiment is simple. Thus, the circuit structure for implementing the sensing method can be simplified, so as to reduce the cost. In addition, when the sensing method is implemented by the sensing apparatus 100, the effect of the sensing apparatus 100 as described previously can also be achieved, which will not be described herein again.

Figure 14:
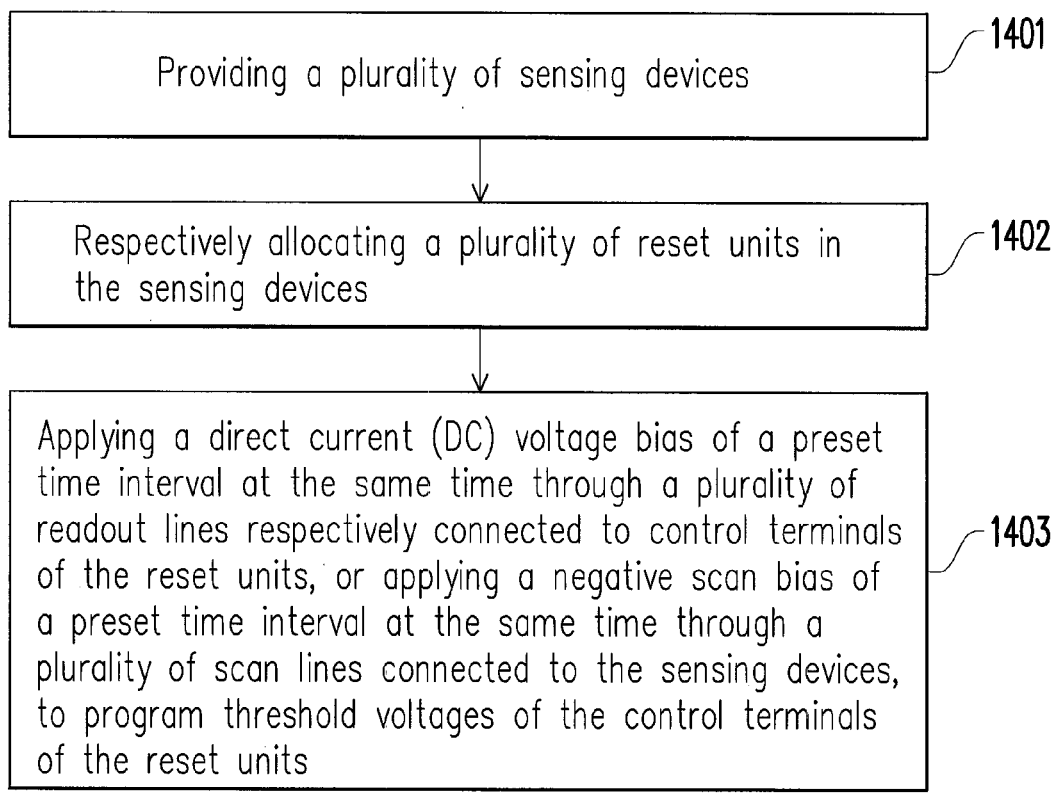
FIG. 14 is a flowchart illustrating a driving method of a reset unit of the sensing apparatus of FIG. 1 according to an embodiment.

FIG. 14 is a flowchart illustrating a driving method of a reset unit of the sensing device of FIG. 1 according to an embodiment. The driving method of the embodiment of FIG. 14 may continuously bias all reset units of sensing devices in the same column for a preset time interval, so as to adjust input ranges of threshold voltages of control terminals of all reset units. Referring to FIG. 1 and FIG. 14, the driving method of the present embodiment may be implemented by the sensing apparatus 100 of FIG. 1. The driving method of the present embodiment may include the following steps. In Step 1401, a plurality of sensing devices 200 is provided in the sensing apparatus 100. For example, the sensing devices 200a, 200b, 200c and 200d of FIG. 1 and other sensing devices 200 may be provided. In Step 1402, a plurality of reset units 240 is respectively disposed in the sensing devices 200. For example, the reset units 240a, 240b, 240c and 240d and other reset units 240 may be respectively disposed in the sensing devices 200a, 200b, 200c and 200d and other sensing devices 200.

In Step 1403, a direct current (DC) voltage bias of a preset time interval is applied at the same time through a plurality of readout lines 120 respectively connected to control terminals T7 of the reset units 240, or a negative scan bias of a preset time interval is applied at the same time through a plurality of scan lines connected to the reset units 240 of the sensing devices 200, to program threshold voltages of the control terminals of the reset units.

For example, a direct current voltage being a positive voltage (for example, 10 V) or negative voltage (for example, −10 V) is applied on the control terminals T7 of the reset units 240a, 240b, 240c and 240d and other reset units 240, and the same voltage is continuously applied in a preset time interval (for example, one or several hours), so as to cause a positive voltage offset (for example, 0.1 V) or negative voltage offset (for example, −0.1 V) of threshold voltages of the control terminals of the reset units 240 fabricated by an amorphous silicon TFT process.

In an embodiment of the disclosure, the step of applying the direct current biases of the preset time interval at the same time through the readout lines 120a, 120b, 120c and 120d and other readout lines 120 respectively connected to the control terminals T7 of the reset units 240a, 240b, 240c and 240d and other reset units 240 may include following procedures: applying the direct current bias of the preset time interval on the control terminals of the reset units at the same time through the readout lines, where the direct current bias is a negative voltage.

In another embodiment of the present disclosure, the step of applying the direct current biases of the preset time interval at the same time through the readout lines 120a, 120b, 120c and 120d and other readout lines 120 respectively connected to the control terminals T7 of the reset units 240a, 240b, 240c and 240d and other reset units 240 may include following procedures: applying the direct current bias of the preset time interval on the control terminals of the reset units at the same time through the readout lines, where the direct current bias is a positive voltage.

In other embodiments of the present disclosure, the step of applying the negative scan bias of the preset time interval at the same time through the scan lines 110a, 110b, 110c and 110d and other scan lines 110 connected to the reset units 240a, 240b, 240c and 240d and other reset units 240 may include following procedures: applying a plurality of negative scan biases of the preset time interval on a plurality of corresponding terminals T6 of the reset units 240a, 240b, 240c and 240d and other reset units 240 electrically connected to the scan lines 110a, 110b, 110c and 110d and other scan lines 110 at the same time through the scan lines 110a, 110b, 110c and 110d and other scan lines 110.

Based on the aforementioned description, in the sensing device of the embodiments of the disclosure, as the current of the amplification unit is provided by the scan signal of the scan line, the sensing apparatus may apply a bias to the amplification unit without using any additional bias line. Moreover, in the embodiments of the present disclosure, as the reset of the sensing device is achieved by the scan signal or the reference signal on the readout line or the reference voltage on the readout line, the sensing apparatus may reset the sensing devices without using any additional reset line. The configuration without bias line and reset line may make the structure of the sensing apparatus, the scan line and the readout line finer. Alternatively, from another point of view, the configuration without bias line and reset line may increase a fill factor of the sensing apparatus, thereby improving the sensing sensitivity of the sensing apparatus.

In addition, in the sensing apparatus of the embodiments of the present disclosure, after the storage unit is reset, the current input terminal and the control terminal of the corresponding amplification unit are all in the low voltage level, so that a cross-voltage of the current input terminal and the control terminal of the amplification unit and a cross-voltage of the current input terminal and the current output terminal are both small. As such, the amplification unit has a relatively stable threshold voltage, and current leakage of the amplification unit in the off state can be effectively inhibited. Therefore, the sensing apparatus of the embodiments of the disclosure may effectively reduce noise. In addition, by the amplification function of the amplification unit, the sensing apparatus of the embodiments of the disclosure has a large voltage gain, which also can further improve the sensing sensitivity of the sensing apparatus effectively.

Furthermore, by using the scan signal on the scan line in combination with the reference voltage on the readout line, the sensing device may be read in sequence row by row. The driving method of the embodiments of the disclosure may reset the sensing device in sequence or at the same time after reading a plurality of frames. Therefore, the frames that are read can be averaged, so as to reduce the influence of noises on the sensing apparatus in the sensing time interval.

The driving method of the embodiments of the present disclosure may also continuously bias all reset units of sensing devices in the same column for a preset time interval, so as to adjust input ranges of threshold voltages of control terminals of all reset units.

As the driving method of the embodiments of the present disclosure may use scan signals or reference signals on the readout lines to drive and reset sensing devices, and may reset the sensing devices without using any additional reset line, the driving method of the embodiments of the present disclosure is simple. Thus, the circuit structure for implementing the driving method can be simplified, so as to reduce the cost.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A sensing apparatus, comprising:
 a first scan line;
 a second scan line;
 a readout line;
 a first sensing device, coupled to the first scan line and the readout line, and configured for sensing a first energy, wherein the first sensing device outputs a first readout signal corresponding to the first energy to the readout line in response to a first scan signal on the first scan line, and the first sensing device is reset in response to the first scan signal and a reference signal provided by an external interpretation unit on the readout line, wherein the first sensing device comprises:

a first reset unit, configured for resetting the first sensing device, wherein a first terminal of the first reset unit is coupled to the first scan line, and a control terminal of the first reset unit is coupled to the readout line;

a first sensing unit, configured for sensing the first energy, and converting the sensed first energy to a first data signal;

a first storage unit, coupled to the first scan line and the first sensing unit, and configured for storing the first data signal, wherein one terminal of the first storage unit is coupled to the first scan line, and another terminal of the first storage unit is coupled to a second terminal of the first reset unit, wherein the sensing apparatus further comprising:

a second sensing device, coupled to a second scan line and the readout line, and configured for sensing a second energy, wherein the second sensing device outputs a second readout signal corresponding to the second energy to the readout line in response to a second scan signal on the second scan line, and the first scan signal and the second scan signal enable the first sensing device and the second sensing device in sequence, wherein when the reference signal provided by the external interpretation unit on the readout line is in a high voltage level, the first scan signal on the first scan line enables the first terminal of the first reset unit to be conducted with the second terminal, and the first scan signal is at a low voltage such that the terminal and the other terminal of the first storage unit are both in a low voltage level, so as to reset the first storage unit.

2. The sensing apparatus of claim 1, wherein the first sensing device comprises:

a first amplification unit, having a control terminal coupled to the reset unit, the first scan line and the readout line, the first amplification unit is configured to output the first readout signal corresponding to the first data signal to the readout line in response to the first scan signal from the first scan line.

3. The sensing apparatus of claim 2, wherein the first storage unit is a capacitor, and a capacitance value of the capacitor is greater than 10 times or more of a parasitic capacitance value between a current input terminal and the control terminal of the first amplification unit.

4. The sensing apparatus of claim 2, wherein the first sensing unit is an electromagnetic sensing unit, a pressure sensing unit, a temperature sensing unit or a touch sensing unit.

5. The sensing apparatus of claim 4, wherein the electromagnetic sensing unit is a photodiode, a photoresistor, a photoconductor or a phototransistor.

6. The sensing apparatus of claim 1, wherein the first reset unit is configured for resetting the first storage unit in response to the first scan signal on the first scan line and the reference signal on the readout line.

7. The sensing apparatus of claim 1, wherein the second sensing device comprises:

a second reset unit, configured for resetting the second sensing device, wherein a first terminal of the second reset unit is coupled to the second scan line, and a control terminal of the second reset unit is coupled to the readout line; and a second amplification unit, having a control terminal coupled to the second reset unit, the second scan line and the readout line, wherein the second amplification unit is configured to output the second readout signal corresponding to the second data signal to the readout line in response to the second scan signal from the second scan line.

8. The sensing apparatus of claim 7, wherein the second sensing device further comprises:

a second sensing unit, configured for sensing the second energy, and converting the sensed second energy to a second data signal;

a second storage unit, coupled to the second scan line and the second sensing unit, and configured for storing the second data signal, wherein one terminal of the second storage unit is coupled to the second scan line, and the other terminal of the second storage unit is coupled to the second terminal of the second reset unit.

9. The sensing apparatus of claim 8, wherein the second reset unit is configured for resetting the second storage unit in response to the second scan signal on the second scan line and the reference signal on the readout line.

10. The sensing apparatus of claim 8, wherein the second storage unit is a capacitor, and a capacitance value of the capacitor is greater than 10 times or more of a parasitic capacitance value between the current input terminal and the control terminal of the second amplification unit.

11. The sensing apparatus of claim 1, wherein the first energy and the second energy are light energy, electromagnetic energy, mechanical energy, heat energy or electric energy.

12. A driving method, applicable to a sensing apparatus, comprising:

in the sensing apparatus, providing a first sensing device and a second sensing device to respectively sense a first energy and a second energy;

making the first sensing device output a first readout signal corresponding to the first energy in response to a first scan signal;

making the second sensing device output a second readout signal corresponding to the second energy in response to a second scan signal; and resetting the first sensing device and the second sensing device at the same time or in sequence in response to a reset voltage respectively applied to them having at least one pulse signal, wherein the step of resetting the first sensing device and the second sensing device at the same time or in sequence in response to the reset voltage having the at least one pulse signal comprises:

when a reference voltage on the readout line connected to the first sensing device and the second sensing device is at a high voltage, repeating a read frame procedure for at least two times, to obtain a plurality of readout signals of a plurality of frames, wherein each read frame procedure comprises applying a first positive voltage pulse scan signal through the first scan line connected to the first sensing device to enable the first sensing device, and after the first sensing device is enabled, applying a second positive voltage pulse scan signal through the second scan line connected to the second sensing device to enable the second sensing device; and in a plurality of reset time intervals of a reset frame after repeating the read frame procedure for at least two times, applying a first negative voltage pulse scan signal through the first scan line connected to the first sensing device to reset the first sensing device, and after the first sensing device is reset, applying a second negative voltage pulse scan signal through the second scan line connected to the second sensing device to reset the second sensing device.

13. The driving method of claim 12, wherein the first scan signal and the second scan signal respectively enable the first sensing device and the second sensing device in sequence.

14. The driving method of claim 12, wherein the step of making the first sensing device output the first readout signal corresponding to the first energy in response to the first scan signal comprises:
converting the sensed first energy to a first data signal;
storing the first data signal; and
outputting the first readout signal corresponding to the first data signal in response to the first scan signal.

15. The driving method of claim 14, wherein the step of making the second sensing device output the second readout signal corresponding to the second energy in response to the second scan signal comprises:
converting the sensed second energy to a second data signal;
storing the second data signal; and
outputting the second readout signal corresponding to the second data signal in response to the second scan signal.

16. The driving method of claim 15, wherein the step of resetting the first sensing device and the second sensing device at the same time or in sequence in response to the reset voltage having the at least one pulse signal comprises:
executing a column reset procedure, wherein the column reset procedure is that when the first scan signal and the second scan signal are both in a low voltage level, the first scan signal resets the stored first data signal, and the second scan signal resets the stored second data signal, as enabled by a reference signal at a high voltage level provided by the readout line connected to both the first sensing device and the second sensing device.

17. The driving method of claim 15, wherein the step of resetting the first sensing device and the second sensing device at the same time or in sequence in response to the reset voltage having the at least one pulse signal comprises:
executing a global reset procedure, wherein the global reset procedure is that when all scan signals in the sensing device are in a low voltage level, all the scan signals reset all data signals stored by all sensing devices in the sensing apparatus, as enabled by a plurality of reference signals in a high voltage level provided by all readout lines in the sensing device at the same time.

18. The driving method of claim 15, wherein the step of resetting the first sensing device and the second sensing device at the same time or in sequence in response to the reset voltage having the at least one pulse signal comprises:
repeating the read frame procedure for at least two times, to obtain the plurality of readout signals of the plurality of frames, wherein each read frame procedure makes all sensing devices in the sensing apparatus output the readout signals corresponding to a plurality of energies respectively in response to a plurality of corresponding scan signals;
averaging the readout signals of the frames to obtain a plurality of readout signals of an average frame; and
after repeating the read frame procedure for at least two times, making the first sensing device and the second sensing device to be reset at the same time or in sequence in response to the reset voltage having the at least one pulse signal.

19. The driving method of claim 15, wherein the step of resetting the first sensing device and the second sensing device at the same time or in sequence in response to the reset voltage having the at least one pulse signal further comprises:
in a reset time interval of a reset frame after repeating the read frame procedure for at least two times, providing a plurality of negative voltage pulse scan signals at the same time through all scan lines to respectively reset all sensing devices in the sensing apparatus.

20. The driving method of claim 12, wherein the first energy and the second energy are light energy, electromagnetic energy, mechanical energy, heat energy or electric energy.

21. A driving method, applicable to a sensing apparatus, comprising:
providing a plurality of sensing devices in the sensing apparatus;
respectively disposing a plurality of reset units in the sensing devices; and
applying a plurality of direct current biases of a preset time interval at the same time through a plurality of readout lines respectively connected to a plurality of control terminals of the reset units, or applying a plurality of negative scan biases of the preset time interval at the same time through a plurality of scan lines connected to the reset units, to program a plurality of threshold voltages of the control terminals of the reset units, wherein the preset time interval is at least one hour,
wherein the sensing apparatus comprises:
a first scan line of the plurality of scan lines;
a second scan line of the plurality of scan lines;
a specific readout line of the plurality of readout lines;
a first sensing device of the plurality of sensing devices, coupled to the first scan line and the specific readout line, and configured for sensing a first energy, wherein the first sensing device outputs a first readout signal corresponding to the first energy to the specific readout line in response to a first scan signal on the first scan line, and the first sensing device is reset in response to the first scan signal and a reference signal provided by an external interpretation unit on the specific readout line, wherein the first sensing device comprises:
a first reset unit, configured for resetting the first sensing device, wherein a first terminal of the first reset unit is coupled to the first scan line, and a control terminal of the first reset unit is coupled to the specific readout line;
a first sensing unit, configured for sensing the first energy, and converting the sensed first energy to a first data signal;
a first storage unit, coupled to the first scan line and the first sensing unit, and configured for storing the first data signal, wherein one terminal of the first storage unit is coupled to the first scan line, and another terminal of the first storage unit is coupled to a second terminal of the first reset unit,
wherein the sensing apparatus further comprising:
a second sensing device of the plurality of sensing devices, coupled to the second scan line and the specific readout line, and configured for sensing a second energy, wherein the second sensing device outputs a second readout signal corresponding to the second energy to the specific readout line in response to a second scan signal on the second scan line, and the first scan signal and the second scan signal enable the first sensing device and the second sensing device in sequence,
wherein when the reference signal provided by the external interpretation unit on the specific readout line is in a high voltage level, the first scan signal on the first scan line enables the first terminal of the first reset unit to be conducted with the second terminal, and the first scan signal is at a low voltage such that the terminal and the other terminal of the first storage unit are both in a low voltage level, so as to reset the first storage unit.

22. The driving method of claim 21, wherein the step of applying the direct current biases of the preset time interval at the same time through the readout lines respectively connected to the control terminals of the reset units comprises:
  applying the direct current bias of the preset time interval on the control terminals of the reset units at the same time through the readout lines, wherein the direct current bias is a negative voltage.

23. The driving method of claim 21, wherein the step of applying the direct current biases of the preset time interval at the same time through the readout lines respectively connected to the control terminals of the reset units comprises:
  applying the direct current bias of the preset time interval on the control terminals of the reset units at the same time through the readout lines, wherein the direct current bias is a positive voltage.

24. The driving method of claim 21, wherein the step of applying the negative scan biases of the preset time interval at the same time through the scan lines connected to the reset units comprises:
  applying the negative scan biases of the preset time interval on a plurality of corresponding terminals of the reset units electrically connected to the scan lines at the same time through the scan lines.

* * * * *